US012577108B2

(12) United States Patent
Liu et al.

(10) Patent No.: US 12,577,108 B2
(45) Date of Patent: Mar. 17, 2026

(54) PRE-SEEDING LITHIUM IN ONE-DIMENSIONAL OLIVINE HOSTS FOR LITHIUM EXTRACTION

(71) Applicant: THE UNIVERSITY OF CHICAGO, Chicago, IL (US)

(72) Inventors: Chong Liu, Chicago, IL (US); Gangbin Yan, Chicago, IL (US)

(73) Assignee: The University of Chicago, Chicago, IL (US)

( * ) Notice: Subject to any disclaimer, the term of this patent is extended or adjusted under 35 U.S.C. 154(b) by 279 days.

(21) Appl. No.: 18/684,799

(22) PCT Filed: Aug. 16, 2022

(86) PCT No.: PCT/US2022/040400

§ 371 (c)(1),
(2) Date: Feb. 19, 2024

(87) PCT Pub. No.: WO2023/027911

PCT Pub. Date: Mar. 2, 2023

(65) Prior Publication Data

US 2024/0391777 A1 Nov. 28, 2024

Related U.S. Application Data

(60) Provisional application No. 63/235,987, filed on Aug. 23, 2021.

(51) Int. Cl.
*C01B 25/45* (2006.01)
*C25C 1/02* (2006.01)

(52) U.S. Cl.
CPC ................ *C01B 25/45* (2013.01); *C25C 1/02* (2013.01); *C01P 2002/30* (2013.01);
(Continued)

(58) Field of Classification Search
CPC ... B01D 69/08; B01D 69/147; B01D 67/0006
See application file for complete search history.

(56) References Cited

U.S. PATENT DOCUMENTS

2019/0275473 A1 9/2019 Bhave et al.

FOREIGN PATENT DOCUMENTS

WO WO 2019168941 A1 * 9/2019 ............ C22B 26/12

OTHER PUBLICATIONS

Delacourt, C., Poizot, P., Tarascon, J.-M. & Masquelier, C. The existence of a temperature-driven solid solution in $Li_xFePO_4$ for $0 \leq x \leq 1$. *Nat. Mater.* 4, 254-260, doi:10.1038/nmat1335 (2005).

(Continued)

*Primary Examiner* — Khanh T Nguyen

(74) *Attorney, Agent, or Firm* — Bell & Manning, LLC

(57) ABSTRACT

Methods for selectively extracting lithium ions from samples containing lithium ions and sodium ions are provided. The methods take advantage of the phase separation of lithium-containing phases and sodium-containing phases in inorganic intercalation compounds having one-dimensional (1D) olivine crystal structures, which are also referred to herein as hosts. Benefitting from this phase separation, the methods described herein improve the intercalation of lithium ions in the hosts, relative to the intercalation of sodium ions, by pre-seeding the intercalation compounds with lithium to form high-lithium content solid state phases that favor lithium intercalation over sodium intercalation.

19 Claims, 13 Drawing Sheets

(52) U.S. Cl.
CPC ...... *C01P 2002/50* (2013.01); *C01P 2002/72* (2013.01); *C01P 2002/77* (2013.01); *C01P 2002/85* (2013.01); *C01P 2004/04* (2013.01); *C01P 2006/40* (2013.01)

(56) References Cited

OTHER PUBLICATIONS

Gibot, P. et al. Room-temperature single-phase Li insertion/extraction in nanoscale $Li_xFePO_4$. *Nat. Mater.* 7, 741-747, doi:10.1038/nmat2245 (2008).
Malik, R., Zhou, F. & Ceder, G. Kinetics of non-equilibrium lithium incorporation in $LiFePO_4$. *Nat. Mater.* 10, 587-590, doi:10.1038/nmat3065 (2011).
Liu, H. et al. Capturing metastable structures during high-rate cycling of $LiFePO_4$ nanoparticle electrodes. *Science* 344, 7, doi:10.1126/science.1252817 (2014).
Bai, P., Cogswell, D. A. & Bazant, M. Z. Suppression of Phase Separation in $LiFePO_4$ Nanoparticles During Battery Discharge. *Nano Letters* 11, 4890-4896, doi:10.1021/nl202764f (2011).
Sharma, N. et al. Direct Evidence of Concurrent Solid-Solution and Two-Phase Reactions and the Nonequilibrium Structural Evolution of $LiFePO_4$. *Journal of the American Chemical Society* 134 7867-7873, doi:10.1021/ja301187u (2012).
Malik, R., Abdellahi, A. & Ceder, G. A Critical Review of the Li Insertion Mechanisms in $LiFePO_4$ Electrodes. *Journal of the Electrochemical Society* 160, A3179-A3197, doi:10.1149/2.029305jes (2013).
Zhang, X. et al. Rate-Induced Solubility and Suppression of the First-Order Phase Transition in Olivine $LiFePO_4$. *Nano Letters* 14, 2279-2285, doi:10.1021/n1404285y (2014).
Hess, M., Sasaki, T., Villevieille, C. & Novák, P. Combined operando X-ray diffraction-electrochemical impedance spectroscopy detecting solid solution reactions of $LiFePO_4$ in batteries. *Nature Communications* 6, 8169, doi:10.1038/ncomms9169 (2015).
Li, Y. et al. Fluid-enhanced surface diffusion controls intraparticle phase transformations. *Nat. Mater.* 17, 915-922, doi:10.1038/s41563-018-0168-4 (2018).
Gangbin Yan et al., "The role of solid solutions in iron phosphate-based electrodes for selective electrochemical lithium extraction," *Nature Communications* (2022)13: 4579.
Li, Zhaojin, et al., "Orientation-dependent lithium miscibility gap in LiFePO4." *Chemistry of Materials* 30.3 (2018): 874-878.
Liang Hong et al., "A mechanism of defect-enhanced phase transformation kinetics in lithium iron phosphate olivine," *npj Computational Materials* (2019)5:118; https//doi.org/10.1038/s41524-019-0255-3.
Matthew R. Roberts et al., "Direct Observation of Active Material Concentration Gradients and Crystallinity Breakdown in LiFePO4 Electrodes During Charge/Discharge Cycling of Lithium Batteries," The Journal of Physical Chemistry 2014, 118, 6548-6557. dx.doi.org/10.1021/jp4111152s.
Liu, C. et al. Lithium Extraction from Seawater through Pulsed Electrochemical Intercalation.*Joule* 4, 1459-1469, doi: 10.1016/j.joule.2020.05.017 (2020).
The International Search Report and Written Opinion issued on Nov. 3, 2022 for international patent application No. PCT/US22/40400; pp. 1-6.
Islam et al., "Atomic-Scale Investigation of Defects, Dopants, and Lithium Transport in the LiFePO4 Olivine-Type Battery Material," *Chem. Mater.* 2005, 17, 20, 5085-5092.
Zhou et al., The Li Intercalation Potential of LiMPO4 and LiMSiO4 olivines with M+Fe, Mn, Co, Ni, *Electrochemistry Communications*, vol. 6, Issue 11, Nov. 2004, pp. 1144-1148.

* cited by examiner

PRE-SEEDING LITHIUM IN ONE-DIMENSIONAL OLIVINE HOSTS FOR LITHIUM EXTRACTION

CROSS-REFERENCE TO RELATED APPLICATIONS

The present application is a National Stage of International Application No. PCT/US22/40400, filed Aug. 16, 2022, which claims priority to U.S. provisional patent application No. 63/235,987 that was filed Aug. 23, 2021, the entire contents of both of which are incorporated herein by reference.

BACKGROUND

Electrochemical lithium extraction from dilute water sources using intercalation hosts shows great potential as a method to secure lithium (Li) supply. One-dimensional (1D) olivine $FePO_4$ is a promising host material owing to its appropriate working potentials, framework stability, thermodynamic Li intercalation preference, and lower Li migration barrier. (Pasta, M. et al., *Energy Environ. Sci.* 5, 9487-9491, (2012); Kim, J.-S. et al. *Environmental science & technology* 49, (2015); Liu, C. et al. Joule 4, 1459-1469, (2020); Nishimura, S.-i. et al. *Nat. Mater.* 7, 707-711, (2008); Ong, S. P. et al. *Energy Environ. Sci.* 4, 3680-3688.) During electrochemical Li extraction, co-intercalation occurs with Na as the main competitor. Despite intriguing proof of concept, the $FePO_4$ host structure response upon Li and Na competitive co-intercalation remains unknown. The intercalation pathways and storage sites are critical in determining the energy barriers for both Li and Na intercalation (including formation enthalpy, migration barrier, nucleation barrier, and interfacial energy), affecting selectivity.

The intercalation behavior of single-component Li or Na in FePO4 hosts has been well studied. During pure Li intercalation, the intercalation pathway depends on the kinetics. Both theoretical and experimental evidence has shown that at slow (de)intercalation rates, Li intercalation follows the domino-cascade intercalation model (Delmas, C., et al., Nat. Mater. 7, 665-671 (2008); Bazant, M. Z. Acc. Chem. Res. 46, 1144-1160 (2013); Brunetti, G. et al., Chemistry of Materials 23, 4515-4524, (2011); Malik, R., et al., Journal of the Electrochemical Societ160, A3179-A3197, (2013).) At high (de)intercalation rates, phase transformations in nanoparticles can proceed via a continuous change in structure without a distinct moving phase boundary, known as non-equilibrium solid solution (SS) model. (Malik, R., et al., Nat. Mater. 10, 587-590, (2011); Liu, H. et al. Science 344, 7, (2014); Bai, P., Nano Letters 11, 4890-4896, (2011); Zhang, X. et al. Nano Letters 14, 2279-2285, (2014).) For Na, high rates were seldom studied due to the sluggish kinetics. Ong, S. P. et al. Energy Environ. Sci. 4, 3680-3688; Lu, J. C., et al., Chemistry of Materials 25, 4557-4565, (2013); Zhu, Y., et al., Nanoscale 5, 780-787, (2013).) At slow rates, according to the phase diagram at room temperature, olivine $Na_yFePO_4$ phase separates into $FePO_4$ and $Na_{2/3}FePO_4$ for $y<2/3$ and remains a solid-solution single phase for $y>2/3$. (Lu, J. C., et al., 2013.) With both Li and Na, there is competition for the storage sites, making the phase behavior more complex. As a result, accounting for the interaction between Na and Li during co-intercalation is crucial for manipulating the intercalation energy landscape for each ion and controlling the Li competitiveness.

SUMMARY

Methods for selectively extracting lithium ions from samples containing lithium ions and sodium ions are provided.

One embodiment of a method for extracting lithium ions from a sample includes the steps of: seeding [010] diffusion channels in an intercalation compound having an olivine crystal structure with lithium ions to form high lithium-content phases in the intercalation compound; exposing the lithium-seeded intercalation compound to a sample comprising lithium ions and sodium ions, and lithiating the lithium-seeded intercalation compound via selective intercalation of lithium ions into the lithium-seeded intercalation compound; removing the lithiated intercalation compound from the sample; and extracting lithium ions from the lithiated intercalation compound to form an intercalation compound that is at least partially delithiated. The methods may be used to selectively extract lithium ions for samples such as brines, geothermal fluids, or industrial wastewater. Intercalation compounds having an olivine crystal structure include transition metal silicates and transition metal phosphates.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A shows a ternary phase diagram of $FePO_4$—$LiFePO_4$—$NaFePO_4$. The stable phases (dots) are $FePO_4$, $LiFePO_4$, $Na_{2/3}FePO_4$, and $NaFePO_4$. FIG. 1B is a schematic illustrating the setup of scanning electron nanodiffraction. FIG. 1C shows absolute a, c-lattice constant maps of the $LN(0.7)_{0.1C}$ particle with their estimated errors (arrows are a guide-to-the-eye for the phase identification). FIG. 1D shows a STEM image and its corresponding EDS elemental mapping (Na, O, Fe) of the $LN(0.7)_{0.1C}$ particle.

FIG. 2A is a schematic showing high C rates in the Li seeding process and Li—Na co-intercalation process. The inset illustrates the possible intercalation pathways at the electrode-solution (E/S) interface. FIG. 2B shows normalized XRD (dotted line: obtained; solid line: fitted) patterns of $FePO_4$ electrodes after seeding with different amounts of Li (10%, 20%, 30% and 40% of total capacity) under 4C, labeled as $L(0.1/0.2/0.3/0.4)_{4C}$. The normalization is based on the intensity of (020) peak for $FePO_4$ at 30.9°. The (020) peak of $LiFePO_4$ is centered at 29.8°. The intensity bands between the two end-up phases are the intermediate SS phases. FIG. 2C shows an example of a deconvoluted XRD pattern for the quantification of SS phases and corresponding R-squared value ($R^2$). The obtained pattern (black dots) of $L(0.3)_{4C}$ is fitted with nine different phases of $Li_xFePO_4$ with x=[0:0.125:1], as calculated based on Vegard's law for the (211) and (020) of the $LiFePO_4$ and $FePO_4$ end phases. FIG. 2D shows averaged accumulative SS phase fractions of $L(0.1/0.2/0.3/0.4)_{4C}$. (Error bars representing the standard deviation of three replicate measurements.)

FIG. 3A shows high-Li SS 237 fractions ($Li_xFePO_4$, x=[0.500:0.125:0.875])

and low-Li SS fractions ($Li_xFePO_4$, x=[0.125:0.125:0.375]) under the same seeding rate 4C with different seeding ranges $L(0.1/0.2/0.3/0.4)_{4C}$. FIG. 3B shows $Li/(Li+Na)_{total}$ (including the contributions from seeded-Li) and $Li/(Li+Na)_{net}$ (subtracting the contributions from seeded-Li) of the same hosts from FIG. 3A after 0.1 C co-intercalation $L(X)_{4C}$—$LN(0.7)_{0.1C}$. FIG. 3C shows the Li/(Li+Na) ratio of the empty hosts with a different intercalation range $L(0)\text{-}LN(X)_{0.1C}$. FIG. 3D shows $Li/(Li+Na)_{net}$ of the electrodes with the same seeding process $L(0.2)_{4C}$ but different intercalation rates $L(0.2)_{4C}\text{-}LN(0.7)_{0.1/0.2/0.5C}$, and the Li/(Li+Na) ratio of the empty hosts $L(0)\text{-}LN(0.7)_{0.01/0.1/0.2/0.5C}$. FIG. 3E shows $Li/(Li+Na)_{net}$ vs. low-Li/high-Li/total-Li SS fractions and corresponding coefficients of determination (COD). FIG. 3F shows $Li/(Li+Na)_{total}$ and $Li/(Li+Na)_{net}$ for the multi-intercalation stability test using $L(0.2)_{4C}\text{-}LN(0.7)_{0.1C}$. (Error bars representing the standard deviation of three replicate measurements.)

FIG. 4A shows XRD of $L(0.2)_{4C}$ electrode before and after 50% Na insertion. Peaks are fitted LFP and FP (020) peaks for $L(0.2)_{4C}$ to guide the peak positions. Bottom bars are the positions of (020) and (211) peaks of nine $Li_xFePO_4$, x=[0:0.125:1]. FIG. 4B shows XRD of $N(0.7)_{0.1C}$ electrode, as well as $N(0.5)_{0.1C}$ electrode before and after 20% Li insertion. FIG. 4C shows XRD of $L(0.2)_{4C}$ electrode before and after five hrs soaking in 1 M $NaCl_{(aq)}$ (Dotted lines: obtained patterns; Solid lines: fitted patterns). FIG. 4D shows the DFT calculation of Li and Na intercalation energy difference for each intermediate phase of $Li_xFePO_4$ with respect to empty $FePO_4$ host.

DETAILED DESCRIPTION

Figure 1B:
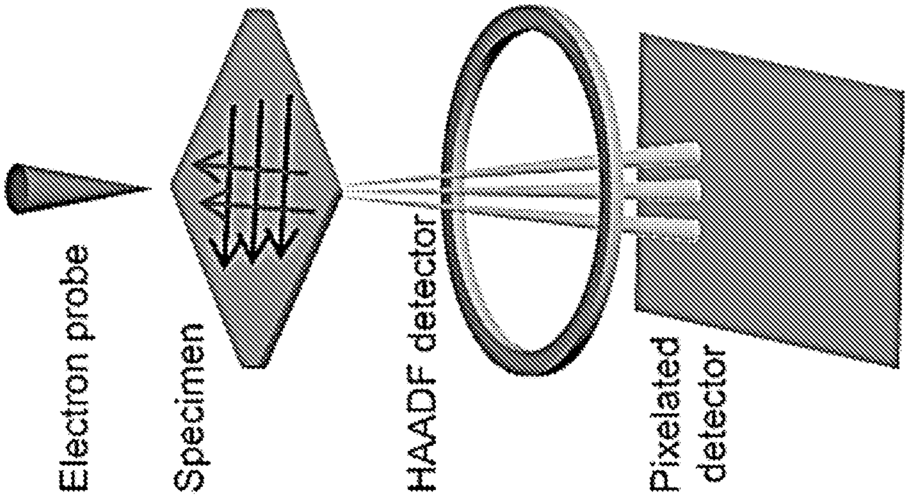
FIGS. 1A-1D show Li and Na phase separation in a $FePO_4$ host.

Methods for selectively extracting lithium ions from samples containing lithium ions and sodium ions are provided. The methods improve lithium selectivity through the manipulation of intercalation pathways in olivine host compounds.

The methods take advantage of the phase separation of lithium-containing phases and sodium-containing phases in inorganic intercalation compounds having one-dimensional (1D) olivine crystal structures, which are also referred to herein as hosts. Benefitting from this phase separation, the methods described herein improve the intercalation of lithium ions in the hosts, relative to the intercalation of sodium ions, by pre-seeding the intercalation compounds with lithium to form high-lithium content solid state phases that favor lithium intercalation over sodium intercalation.

The methods can be used to selectively remove lithium ions from a variety of sample types, including aqueous and non-aqueous liquid samples, such as brines, including geothermal fluids, and wastewater from lithium battery production facilities and other industrial sources. The brines are concentrated saline solution that contain lithium and other cations, typically including high concentrations of sodium and often magnesium and potassium. Brines include brines from natural brine reservoirs, such as salt lakes, sub-surface groundwater (e.g., below the surface of a dried lakebed or other natural body of water), and geothermal brines. Geothermal brines are concentrated saline solutions that have passed through underground rock formations and become enriched in lithium and other elements.

The intercalation compounds having a 1D olivine structure are characterized by [010] diffusion channels through which ions, including lithium ions ($Li^+$), can intercalate into the compound. The olivine intercalation compounds include transition metal phosphates having the formula $TMPO_4$ and transition metal silicates having the formula $TMSiO_4$, where TM represents a Mn, Fe, Co, Ni, or V atom, or a combination of two or more of these atoms. By way of illustration, an olivine transition metal phosphate comprising both iron and manganese atoms can be represented by the formula, $(Fe,Mn)PO_4$, and an olivine transition metal phosphate comprising iron, manganese, and cobalt atoms can be represented by the formula $(Fe,Mn,Co)PO_4$. The olivine compounds may be provided in a variety of forms, including as particles with sub-micrometer diameters or thin films, and may be supported on an electrically conductive electrode substrate to facilitate electrochemical lithium seeding, as well as electrochemical lithiation/delithiation cycling.

The seeded intercalation compounds can be made from starting host compounds that are free of lithium or have an initial lithium content that is lower than the targeted lithium seeding content. Generally, the concentration of lithium in the seeded intercalation compounds will exceed the concentration of lithium corresponding to the intrinsic room temperature (23° C.) solubility of lithium in the olivine host compound. For the purposes of this disclosure, the intrinsic solubility of lithium in the olivine host is determined by the miscibility gap of lithium olivine hosts. (See, Li, ZhaoJin, et al. "Orientation-dependent lithium miscibility gap in $LiFePO_4$." *Chemistry of Materials* 30.3 (2018): 874-878.) The lithium seeding content can be selected and controlled based on the particular host compound being used and the seeding rate. By way of illustration, the lithium concentration in the seeded olivine intercalation compounds may be at least 10% (percent based on moles) of total lithium capacity, at least 20% of total lithium capacity, or at least 30% of total lithium capacity. For example, the lithium concentration in the seeded intercalation compounds can be in the range from 10% to 50% of the total lithium capacity. Total lithium capacity denotes the amount of accessible storage sites for the extraction at a certain specific current. For a given olivine intercalation compound, one can use constant current cycling in pure Li salts solutions (e.g., 1M $LiCl_{(aq)}$) to measure the accessible lithium capacity, as illustrated in the Example.

Without intending to be bound to any particular theories of the inventions discloses herein, the improved selectivity for lithium over sodium exhibited by the pre-seeded intercalation compounds can be explained the partial filling of 1D lithium channels via lithium seeding. The high lithium content in the channels changes the relative intercalation barriers between sodium and lithium by raising the sodium phase formation energy barrier.

The seeding of lithium to concentrations above its intrinsic solubility limit may be achieved chemically or electrochemically. For example, an electrochemical seeding can be conducted by pairing an electrode comprising the starting host compound with a counter electrode in an electrochemical cell containing a lithium ion-containing electrolyte and applying a voltage across the electrodes. At sufficiently high intercalation rates, phase transformations in the intercalation compounds proceed via a continuous change in structure without a distinct moving phase boundary in a process known as the non-equilibrium solid solution (SS) model. As illustrated in the Example, the phase fractions in the seeded intercalation compounds may be controlled by the C rate during electrochemical seeding, where a higher C rate generally promotes the formation of the high lithium-content phases that favor lithium intercalation over sodium intercalation. (C-rate is the rate at which a cell is (dis)charged relative to its maximum capacity. For example, a 1 C rate means that the (dis)charge current will (dis)charge the entire cell in 1 hour, while the time for 2C will be 30 mins.) For the purposes of this disclosure, the phrase "high lithium-content phases" refers to $Li_xTMPO_4$ or $Li_xTMSiO_4$ phases where $0.5 \leq x < 1$ and the phrase "low lithium-content phases" refers to $Li_xTMPO_4$ or $Li_xTMSiO_4$ phases where $0 < x < 0.5$. Thus, phases having x values of 0.500, 0.625, 0.750, and/or 0.875 would be considered high lithium-content phases, while phases having x values of 0.125, 0.250, and/or 0.375 would be considered low lithium-content phases.

In the seeded intercalation compounds, the high lithium content phases may make up a substantial fraction of the material. For example, the phase fraction of high lithium-content phases in a seeded intercalation compound may be at least 0.25. This includes embodiments having a high lithium-content phase fraction of at least 0.30 and embodiments having a high lithium-content phase fraction in the range from 0.25 to 0.35.

Once the intercalation compounds are seeded to the desired level, they may be exposed to (e.g., submerged in) a sample containing a mixture of lithium ions and sodium ions to carry out the selective extraction of lithium ions, whereby selective extraction is achieved by the preferential intercalation of lithium ions over sodium ions in the seeded intercalation compounds. As used herein the phrase selective extraction refers to an extraction in which the ratio of extracted lithium ions to another extracted ion (e.g., sodium ions) is higher than the ratio of said two ions in the sample from which they were extracted. The selective intercalation can be carried out electrochemically by pairing an electrode comprising the seeded intercalation compounds with a counter electrode, such as a sodium-ion containing electrode, in an electrochemical cell containing the sample and applying a voltage across the electrodes. Under the influence of an applied potential, lithium ions from the sample become intercalated into the seeded intercalation compound, thereby lithiating the seeded intercalation compound (and delithiating the sample). Once a desired, or maximum, amount of lithium has been removed from the lithium ion- and sodium ion-containing sample, the lithiated intercalation compounds can be removed from said sample and lithium ions can be extracted (recovered) from the intercalation compounds by various means. For example, a discharge solution can be introduced into the electrochemical cell and lithium ions can be extracted from the lithiated intercalation compounds by reversing the applied potential. In this manner the intercalation compounds are delithiated.

The delithiation of the lithiated intercalation compounds can be, but need not be, carried out to completion. However, if multiple lithiation/delithiation cycles are to be carried out, it may be advantageous to retain a portion of the lithium ions in the intercalation compounds during delithiation so that high lithium-content phases present in the compounds are preserved in order to promote selective lithium intercalation during relithiation in the subsequent cycle. By way of illustration, in some embodiments of the methods described herein, the intercalation compounds are only partially delithiated, retaining a lithium ion content between cycles of at least 10% of total capacity, at least 20% of total capacity, or at least 30% of total capacity.

Example

This example demonstrates, via density functional theory (DFT) calculation and direct structural characterization, that Li and Na tend to phase separate in 1D $FePO_4$ hosts. X-ray diffraction (XRD), scanning electron nanodiffraction (SEND), and energy dispersive X-ray spectroscopy (EDS) characterization all showed distinctive Li and Na phases at both the single-particle level and for particle ensembles. Guided by the Li and Na phase separation behavior, Li SS phases were pre-created with partially filled 1D Li channels via seeding to change the relative intercalation barriers between Na and Li to repel Na. Compared to empty hosts, the Li-seeded hosts showed selectivity increases of ~1.6-fold and ~3.8-fold with 20% and 40% Li-seeding, respectively. With 40% Li-seeding, the total Li fraction ($Li/(Li+Na)_{total}$) in the host was ~94%. The selectivity enhancement strongly correlated with the phase fraction of high-Li SS phases ($Li_xFePO_4$, $0.5 \leq x < 1$), but weakly correlated with the phase fraction of low-Li SS phases ($Li_xFePO_4$, $0 < x < 0.5$). The high-Li SS phases were effective in preventing the intercalation of Na at different C rates and persist even upon pure Na intercalation. This work demonstrates the importance of manipulating intercalation kinetic pathways to control ion selectivity and points out that guiding the host phase evolution to undergo Li solid solution formation is an effective strategy to enhance the Li to Na selectivity.

Results and Discussion

$FePO_4$ Host Phase Behavior Upon Li and Na Co-Intercalation

Figure 1A:
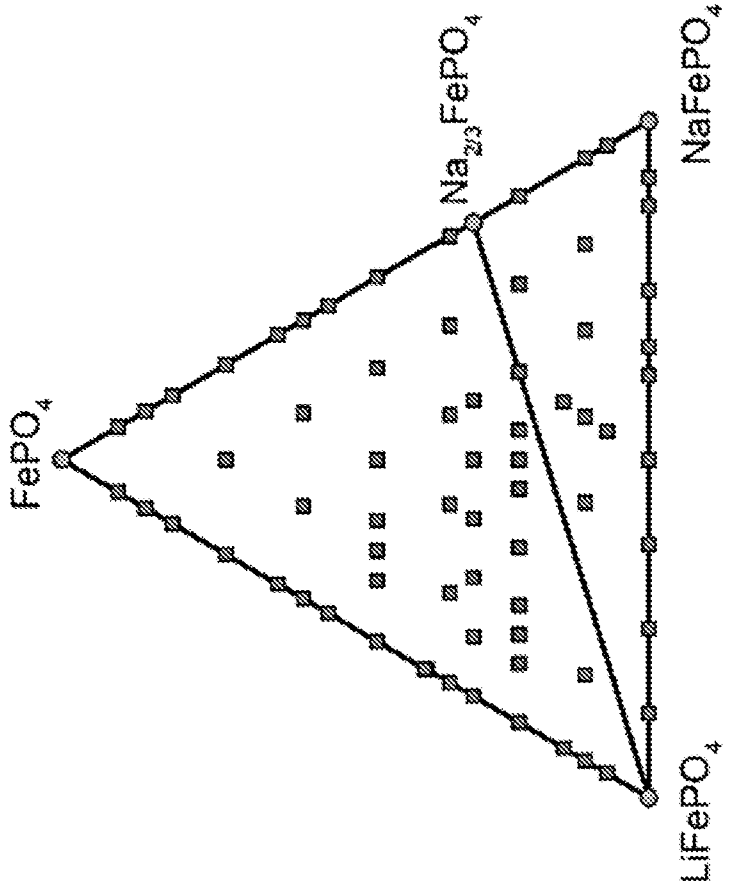

DFT was first used to calculate the formation enthalpies of different structures with Li and Na co-existence. FIG. 1A shows the calculated ternary phase diagram of $FePO_4$—$LiFePO_4$—$NaFePO_4$. $FePO_4$, $LiFePO_4$, $Na_{2/3}FePO_4$, and $NaFePO_4$ are the ground state structures. Among the 506 structures calculated with a maximum super cell size of 86, there was no ground state configuration with a mixture of Li and Na, indicating that Li and Na do not prefer to co-exist in the same [010] channel during co-intercalation. Intermediate compositions were expected to decompose into these four ground state phases depending on the composition.

Figure 1C:
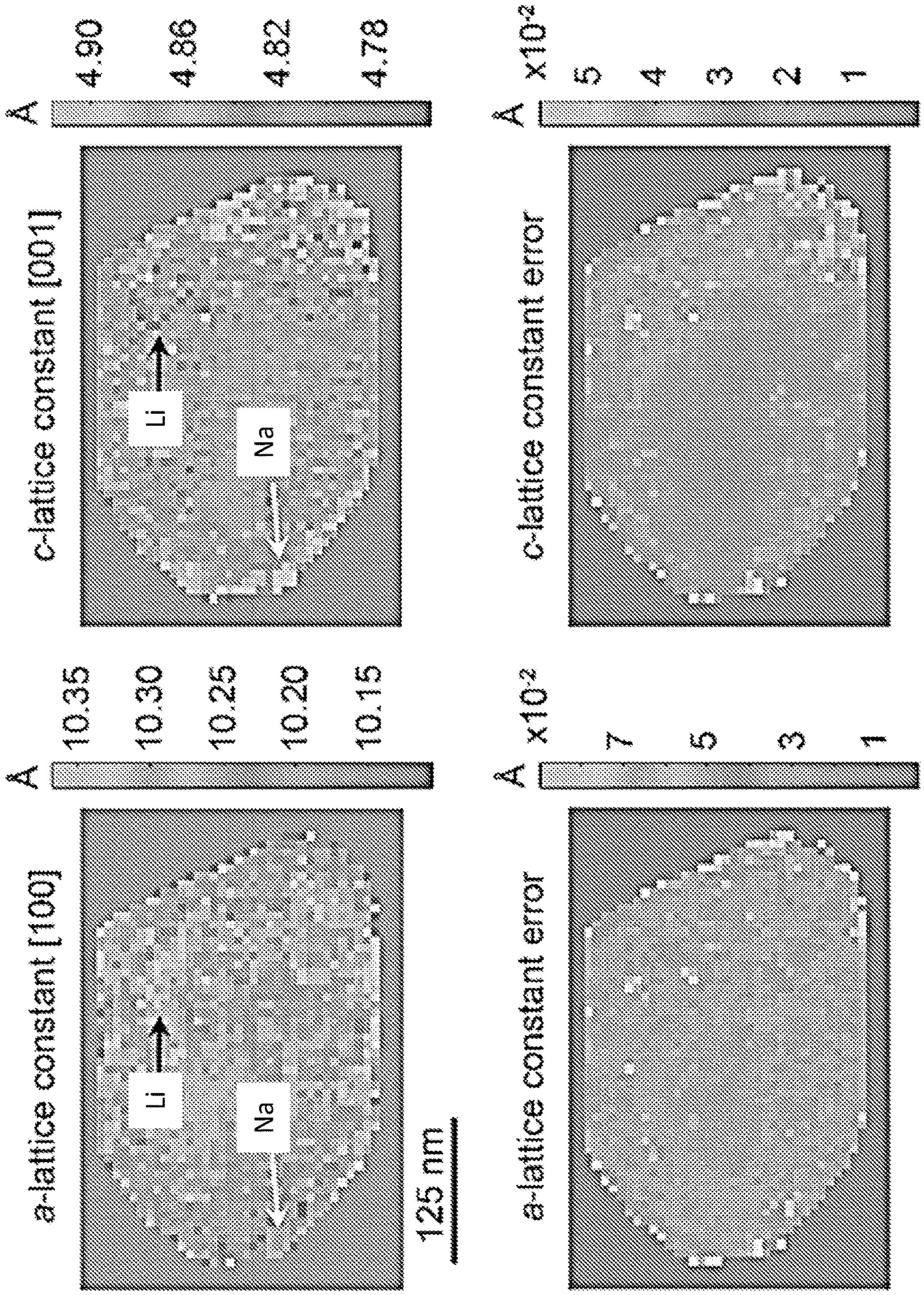
Figure 1D:
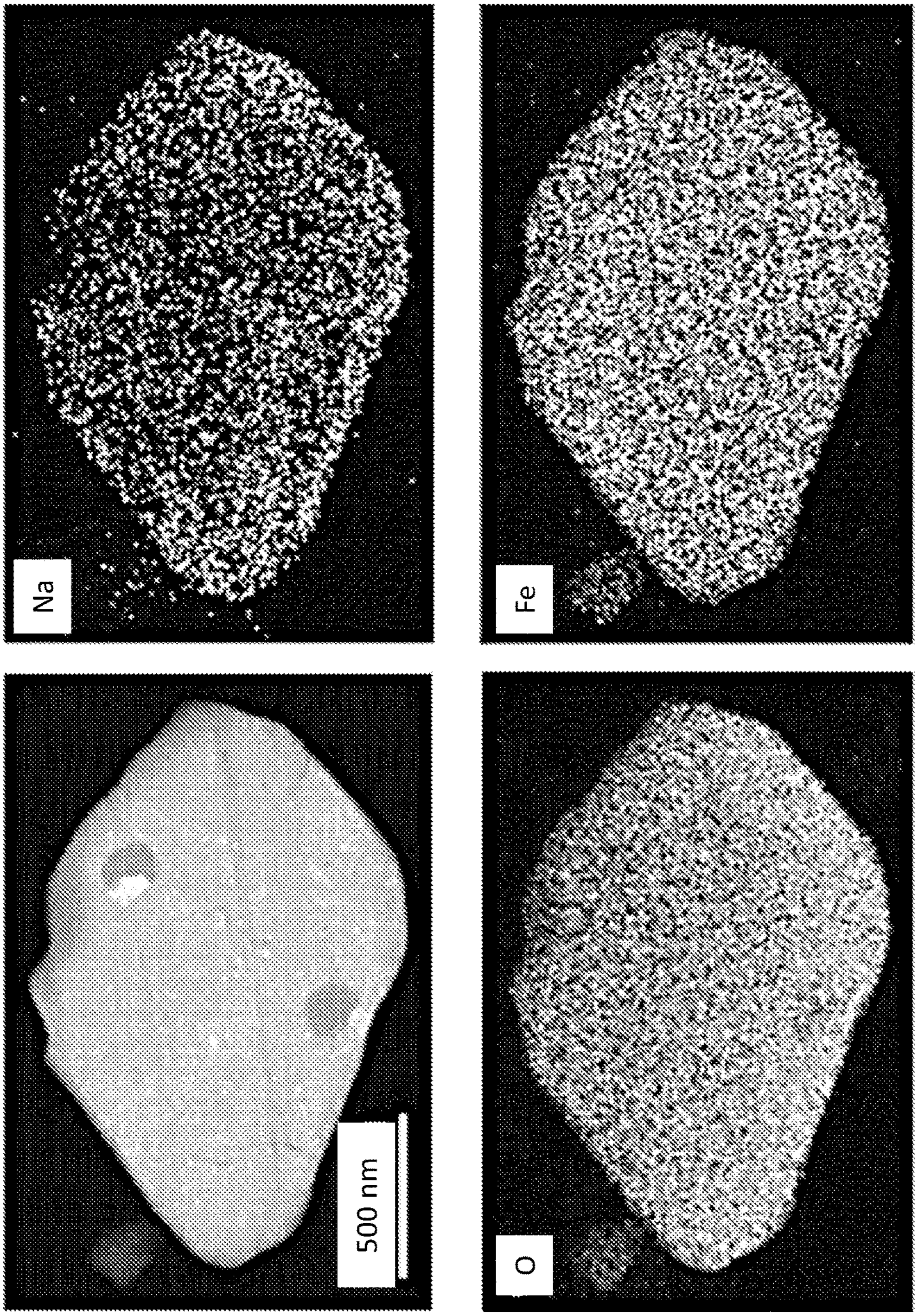

To verify the calculation results experimentally, scanning electron nanodiffraction (SEND) was first used (FIGS. 1B, 1C) to identify existing phases at a single particle level. The particles were prepared by directly intercalating $FePO_4$ hosts in a 1 mM LiCl and 1 M NaCl (Li:Na=1:1000) mixed solution under 0.1 C using 70% of the total capacity, labeled as $LN(0.7)_{0.1C}$. The ratio of 1:1000 Li:Na was selected based on the compositions of brines and geothermal fluids. The platelet particles were observed along [010] channel direction. The lattice constant maps were constructed with the estimated errors as shown in FIG. 1C. Lattice constants for potentially related Li or Na phases are summarized in Table 1. The lattice constant range pointed to the co-existence of olivine $LiFePO_4$ (a, b, c-lattice constants=10.329, 6.009, 4.695 Å) and olivine $Na_{2/3}FePO_4$ (a, b, c-lattice constants=10.289, 6.082, 4.937 Å) phases and ruled out the existence of olivine $FePO_4$ (a-lattice constant=9.821 Å), olivine $NaFePO_4$ (a=10.406 Å; c=4.947 Å) and maricite $NaFePO_4$ (a=9.001 Å; c=5.052 Å) phases, since their lattice constants were out of the range. As shown in the SEND mapping, $LiFePO_4$ phase mainly existed in the center of the particle (light areas in FIG. 1C, a-lattice constant map), and $Na_{2/3}FePO_4$ phase is mainly at the edges (light areas in FIG. 1C, c-lattice constant map) as guided by the arrows. The matching of lattice constants to pure Li and Na phases supports the Li and Na phase separation behavior. Meanwhile, lattice strains were calculated. The contraction and expansion of c-lattice parameter in the [001] direction clearly show the results of Li and Na intercalating separately. It is also worth noting that from c-lattice constant map (FIG. 1C), Na SS phases were observed with intermediate c-lattice constants (0.482 nm~0.486 nm). The formation of metastable Na SS phases at 0.1 C was confirmed with pure Na intercalation. XRD shows that the Na SS phase separated into $Na_{2/3}FePO_4$ and $FePO_4$ after one month of storage. Therefore, 0.1 C is already a high current rate to drive a solid solution pathway between $FePO_4$ and $Na_{2/3}FePO_4$ phases. Secondly, scanning transmission electron microscopy (STEM) with energy-dispersive X-ray spectroscopy (EDS) was used to map the elemental distribution (FIG. 1D). Na mapping showed nonuniform signal across the particle with higher intensity near the edges. The EDX mapping matches well with the SEND phase analysis and reveals the existence of $Na_{2/3}FePO_4$ near the edge of the particle (light areas in FIG. 1C, c-lattice constant mapping). At the electrode level for particle ensembles, the XRD pattern of the $LN(0.7)_{0.1C}$ electrode also showed a co-existence of $LiFePO_4$ and $Na_{0.71}FePO_4$ phases in $Li_xFePO_4$ and n is the C rate used in the seeding process. An ideal case would be for most of the channels to have some Li to repel Na.

Figure 2A:
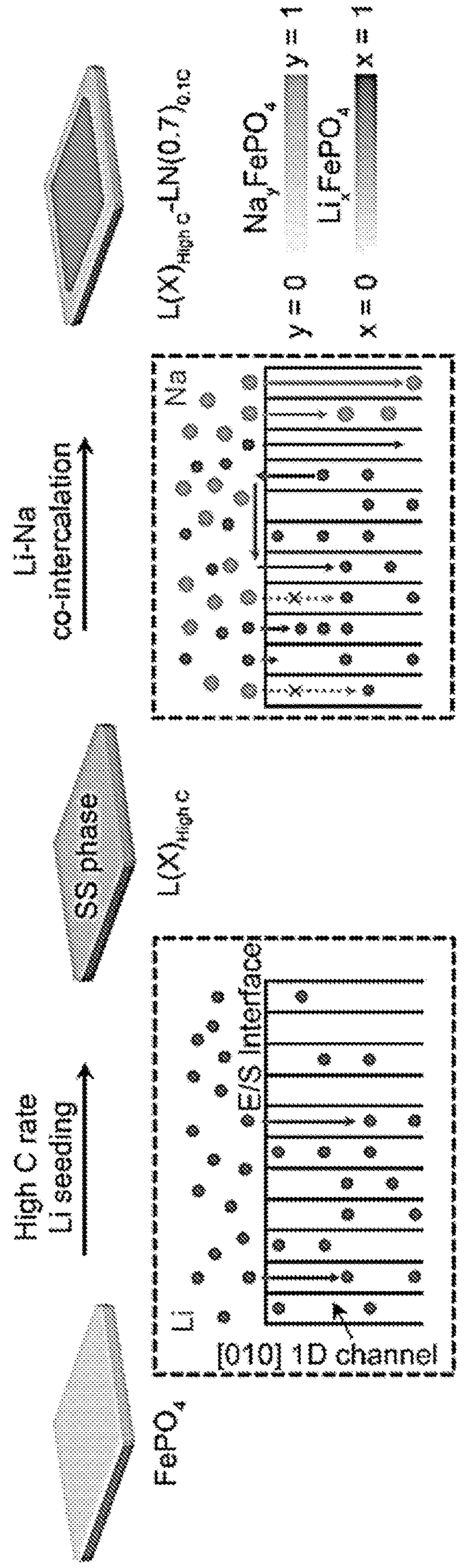
FIGS. 2A-2D show seeding and quantification of Li SS phases.
Figure 2B:
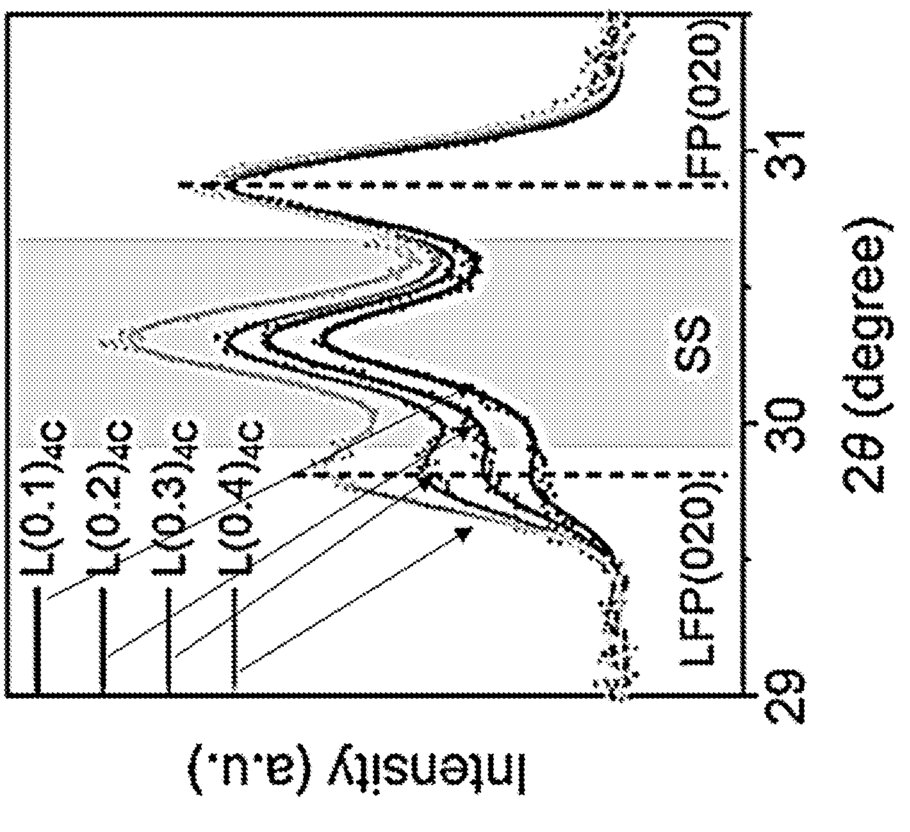
Figure 2C:
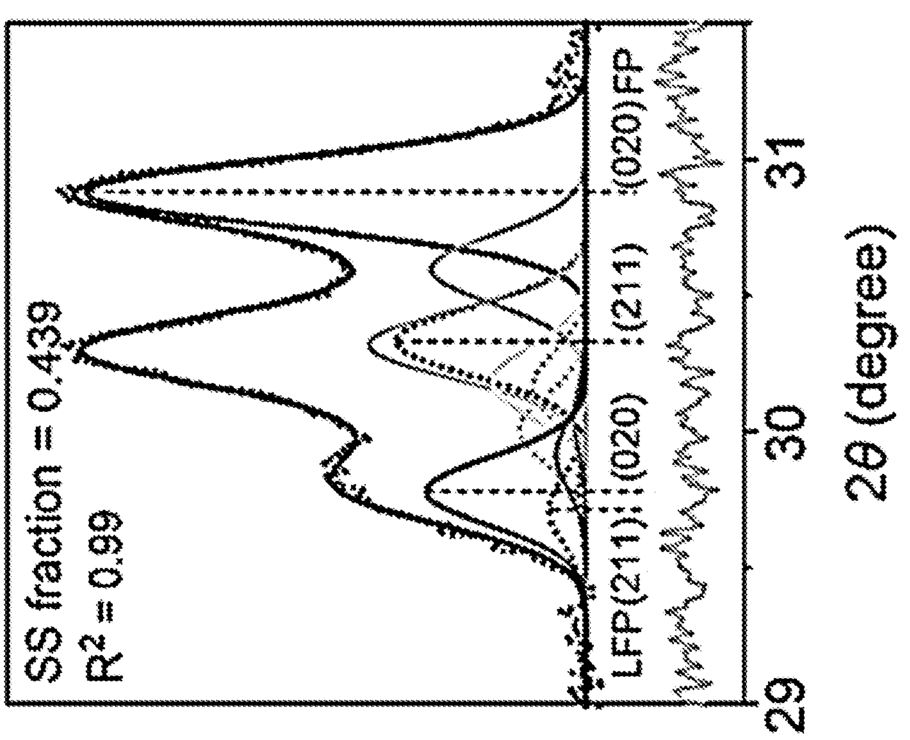
Figure 2D:
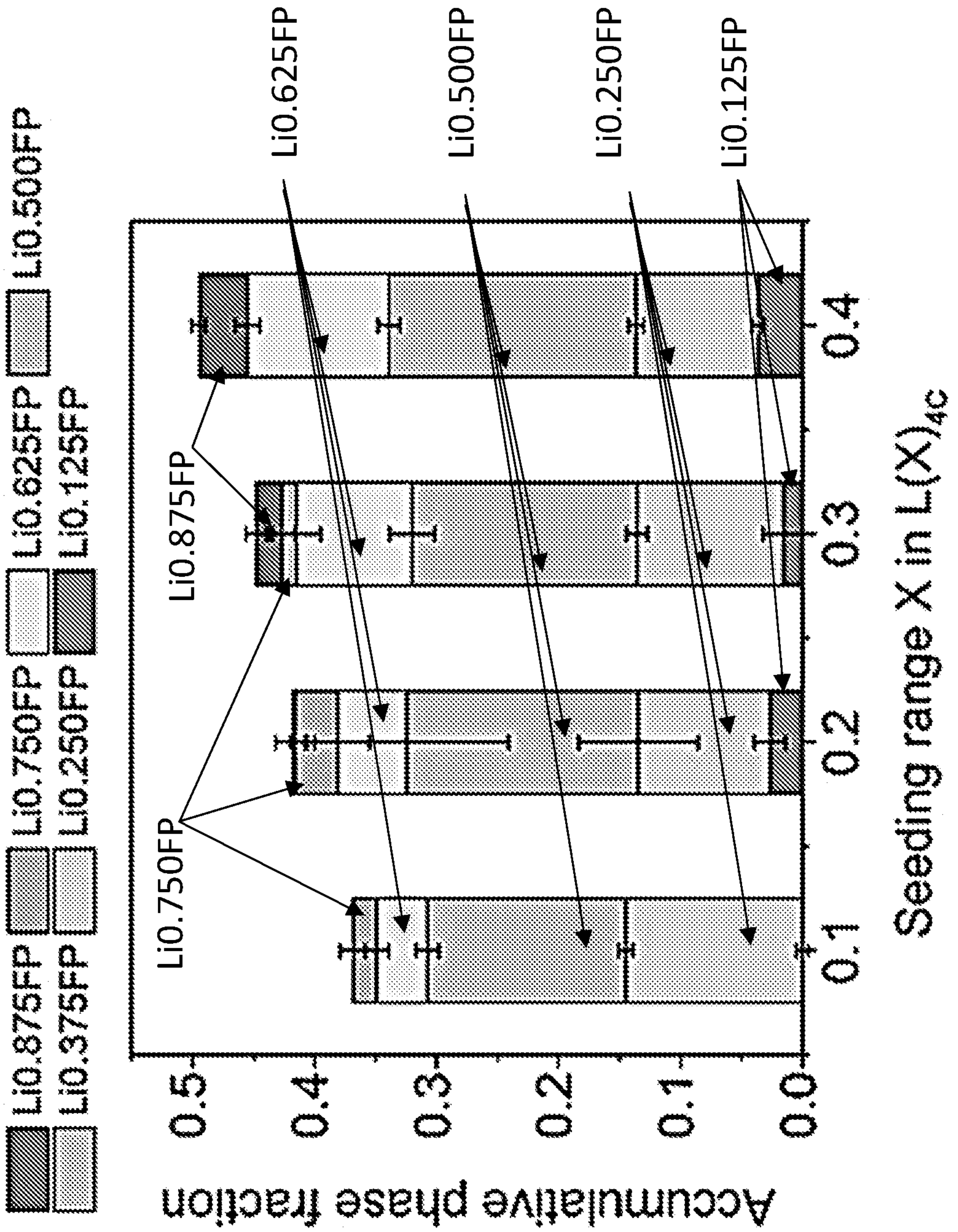

The Li SS phases and their fractions were quantified by XRD characterization after seeding. FIG. 2B shows the normalized XRD patterns of $FePO_4$ electrodes after seeding different amounts of Li (10%, 20%, 30%, and 40% of total capacity) under 4C, labeled as $L(0.1/0.2/0.3/0.4)_{4C}$ respectively. The strong intensity band between the characteristic (020) peaks for $FePO_4$ and $LiFePO_4$ indicates the formation of SS phases with a continuous structural change. With more lithium seeded, the peak intensity ratios of SS phases to $FePO_4$ and $LiFePO_4$ to $FePO_4$ increased. Following previous work, a sum of Gaussians was fit to the diffraction patterns, deconvolving seven intermediate phases $Li_xFePO_4$, x=[0.125:0.125:0.875], from $FePO_4$ and $LiFePO_4$ end phases. (Hess, M., et al., Nature Communications 6, 8169, (2015); Li, Y. et al. Nat. Mater. 17, 915-922, (2018).) The center location of each Gaussian based on linear combinations of the refined phases for $LiFePO_4$ and $FePO_4$ was fixed (within a pre-defined window). FIG. 2C shows an example of a deconvoluted XRD pattern. The high $R^2$ value (0.99) confirmed the validity of the deconvolution method. The fitting process can also be verified by the agreement between the actual amount of Li seeded from electrochemical capacity and the weighted sum of Li calculated according to the fitted fractions for each phase. For example, for $L(0.4)_{4C}$, the calculated total Li amount from the fitted phases is ~0.42. The fitted accumulative phase fractions for samples representing the four seeding ranges are summarized in FIG. 2D.

TABLE 1

Lattice parameters for potentially related Li or Na phases and the normalized values by the value of olivine $FePO_4$ (00-065-0258) phase. Lattice parameters of olivine $FePO_4$ are set as one.

| | b [010] (Å) | a [100] (Å) | c [001] (Å) | α | β | γ | Volume (Å$^3$) | c/a | a/b | c/b |
|---|---|---|---|---|---|---|---|---|---|---|
| Olivine LFP (01-077-8344) | 6.009 (+3.7%) | 10.329 (+5.2%) | 4.895 ( 1.9%) | 90.00° | 90.00° | 90.00° | 291.38 (+7%) | 0.781 | 0.582 | 0.455 |
| Olivine $N_{2/3}FP$ (01-079-6974) | 6.082 (+5.0%) | 10.289 (+4.8%) | 4.937 (+3.1%) | 90.00° | 90.00° | 90.00° | 308.98 (+13%) | 0.812 | 0.591 | 0.480 |
| Olivine NFP (01-079-6973) | 6.219 (+7.3%) | 10.406 (+6.0%) | 4.947 (+3.3%) | 90.00° | 90.00° | 90.00° | 320.13 (+18%) | 0.795 | 0.598 | 0.475 |
| Olivine FP (00-085-0258) | 5.785 (1.0) | 9.821 (1.0) | 4.787 (1.0) | 90.00° | 90.00° | 90.00° | 272.46 (1.0) | 0.826 | 0.590 | 0,487 |
| Maricite NFP (01-071-5040) | 6.874 (+18.8%) | 9.001 (−8.4%) | 5.052 (+5.5%) | 90.00° | 90.00° | 90.00° | 312.58 (+15%) | 0.735 | 0.764 | 0.561 |

Pre-Seeding Li and Quantification of SS Phase Fractions

Guided by the results that Li and Na tend to phase separate during co-intercalation, the Li competitiveness in $FePO_4$ hosts was enhanced by creating partially filled Li 1D channels to raise the Na phase formation energy barrier. Improving lithium selectivity through the manipulation of the intercalation pathway has not been demonstrated before. The typical electrochemical (de)intercalation pathway of Li in $Li_xFePO_4$ particles with a sub-micrometer diameter at low current densities is via phase separation during the vast majority of the process ($0.05 \leq x \leq 0.95$). (Malik, R., et al, 2013.) To create partially filled Li 1D channels at room temperature, Li was seeded via the SS phase change pathway at high C rates. The proposed seeding process is illustrated in FIG. 2A. Empty $FePO_4$ was first created by chemical deintercalation of $LiFePO_4$. Then, a target amount of Li was seeded from 1 M $LiCl_{(aq)}$ solution under high C rates to create $L(X)_{nC}$ where X is the percentage of Li filled

Correlation of High-Li SS Phases to Li Selectivity

The effect of seeded Li SS phases on Li selectivity was investigated using 1:1000 Li to Na solution (1 mM LiCl and 1 M NaCl mixed solution). It should be noted that two different Li/(Li+Na) ratios are reported. One is $Li/(Li+Na)_{total}$, which denotes the ratio of the total amount of Li detected in the recovery solution after emptying out the host, and another one is $Li/(Li+Na)_{net}$, which subtracts the initially seeded Li. First, different amounts of Li (0.1/0.2/0.3/0.4) were seeded under 4 C. The total SS fraction increased monotonically with the seeding amount. After seeding, Li extraction was conducted a in 1:1000 Li to Na solution under 0.1 C until 70% of capacity was used, which was labeled as $L(0.1/0.2/0.3/0.4)_{4C}$-$LN(0.7)_{0.1C}$. Both $Li/(Li+Na)_{total}$ and $Li/(Li+Na)_{net}$ showed a monotonic increase, indicating the effectiveness of Li SS phases in promoting Li competitiveness. Specifically, the $Li/(Li+Na)_{net}$ ratio increased from 0.61±0.01 to 0.86±0.01 from 10% to 40% seeding. With 40% seeding, ~3.8 fold increase of Li selectivity to 6.0×103 was achieved, compared to the empty host without seeding.

Figure 3A:
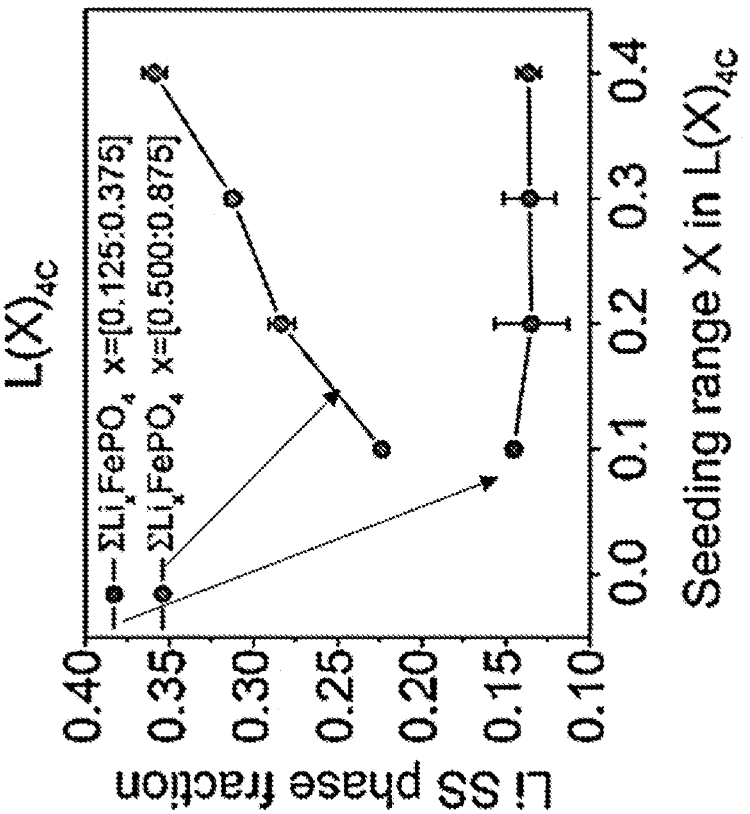
FIGS. 3A-3F show correlation between SS phase fractions and lithium extraction performance.
Figure 3B:
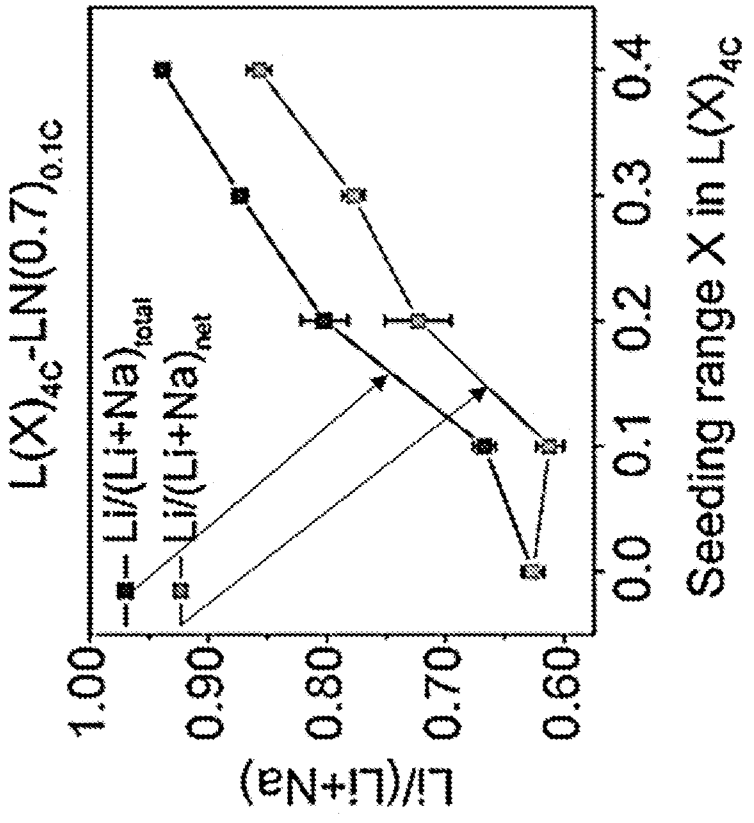
Figure 3C:
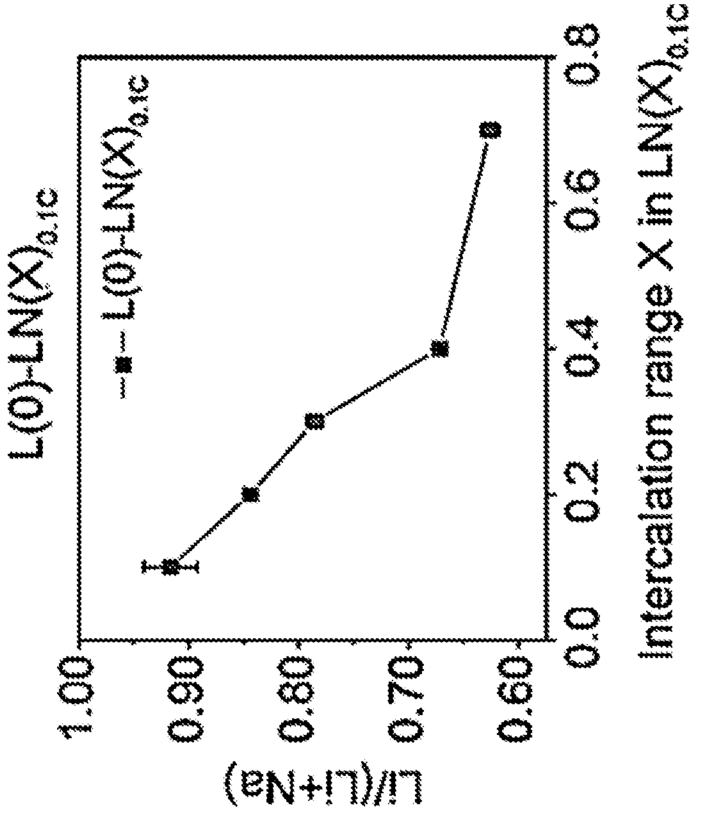

Whether all the seven intermediate SS phases are equivalently effective in enhancing the Li selectivity was further examined. First, the Li selectivity trend was analyzed to each SS phase. None of the phases alone could explain the selectivity trend. Although $Li_{0.625}FePO_4$ phase fraction showed a monotonic increase, the increased Li amount during co-intercalation exceeded the available vacancy amount in $Li_{0.625}FePO_4$ phase. The SS phases were then divided into two groups, the low-Li SS phases ($Li_xFePO_4$, x=0.125/0.250/0.375) and the high-Li SS phases ($Li_xFePO_4$, x=0.500/0.625/0.750/0.875) (FIG. 3A). The Li content in the SS phases should affect the energy barrier for Na intercalation, since Li and Na intercalation into the $FePO_4$ cause contraction and expansion in the [001] direction, respectively. Also, a composition gap was noticed between these two groups, in that the content of $Li_{0.375}FePO_4$ was much smaller than the other SS phases. After grouping, a clear trend was observed, in that the selectivity increase followed the high-Li SS phase fraction increase (FIGS. 3A and 3B). However, the low-Li SS phase remained constant ~13% for all the seeding ranges. The correlation shows that high-Li SS phases contributed the most to the improvement of Li selectivity. Interestingly, when the seeding range was small at 10%, $L(0.1)_{4C}$-$LN(0.7)_{0.1C}$, the $Li/(Li+Na)_{net}$ was comparable with the empty host ($L(0)$-$LN(0.7)_{0.1C}$) (FIG. 3B). To explain this, the capacity range dependent selectivity of the empty $FePO_4$ host was tested (FIG. 3C). The Li/(Li+Na) ratio was 0.92±0.02 for the first 10% capacity and the Li/(Li+Na) ratio decreased with the increase of capacity usage (all 0.1 C). The intrinsic solubility of Li in $FePO_4$ hosts (as SS phase) is around 5%. (Yamada, A. et al. Nat. Mater. 5, 357-360, (2006).) If the first 5% of the $FePO_4$ undergoes SS phase change, with >90% selectivity, this is equivalent to the 4.5% Li seeding process, which explains the similar selectivity between empty $FePO_4$ and 10% Li-seeded hosts. The effect of seeding C rate on SS phase fractions and Li selectivity was also examined with a 20% seeding range. At a slow seeding rate of 0.1 C, the $Li/(Li+Na)_{net}$ of $L(0.2)_{0.1C}$-$LN(0.7)_{0.1C}$ was 0.66±0.03, similar to that of empty FP hosts (0.63±0.01), showing that the domino-cascade model cannot improve the selectivity. With increasing seeding C rates, from 2 C to 8 C, the $Li/(Li+Na)_{net}$ remained at similar value, which is consistent with the comparable high-Li SS fraction in each case. The applied current density of 2 C was already high enough to obtain concurrent, non-mosaic intercalation in the porous electrode, with small variations in the lithium composition. (Li, Y. et al., 2018.)

Figure 3D:
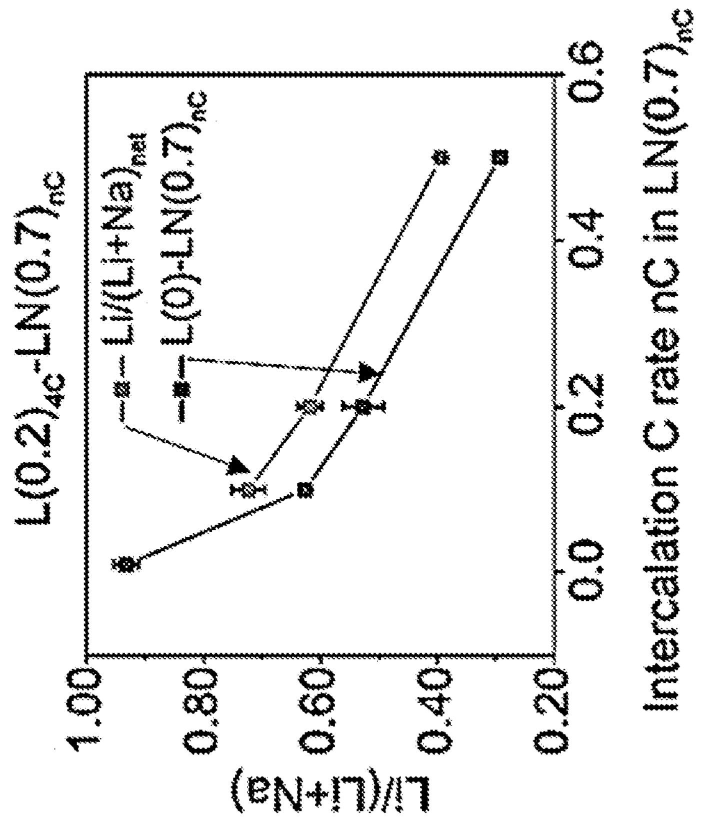

The effectiveness of high-Li SS phases in restricting Na intercalation at different overpotentials was further investigated. Higher overpotentials at larger currents can provide additional energy for Na to overcome its intercalation barrier and decrease the Li selectivity. At an extremely slow current of 0.01 C, the $Li/(Li+Na)_{net}$ molar ratio of $L(0)$-$LN(0.7)_{0.01C}$ was 0.93±0.02 (FIG. 3D). This superior selectivity benefits from the higher Li intercalation potential and lower Li migration barrier. The thermodynamic preference of Li intercalation could compensate for more than three orders of magnitude molar concentration difference between Li and Na. Without Li seeding, with increased intercalation C rates from 0.1 C to 0.5 C, Li/(Li+Na) of empty host decreased drastically from 0.63±0.01 to 0.32±0.01, as a result of higher intercalation overpotentials ~0.22 V (final potential difference). The increased co-intercalation C rates may also cause local depletion of Li on the cathode surface. With Li seeding, as shown in FIG. 3D, at 0.2 C intercalation rate (doubling the C rate), the hosts could still maintain decent selectivities of $Li/(Li+Na)_{net}$=0.62±0.02 comparing to without seeding of $Li/(Li+Na)_{net}$=0.53±0.03. From 0.1 C to 0.5 C, the seeding process was consistently promoting the Li competitiveness. This indicates that the high-Li SS phases are effective in preventing Na intercalation even at fast kinetics and can tolerate a higher overpotential of at least ~0.21 V.

Figure 3E:
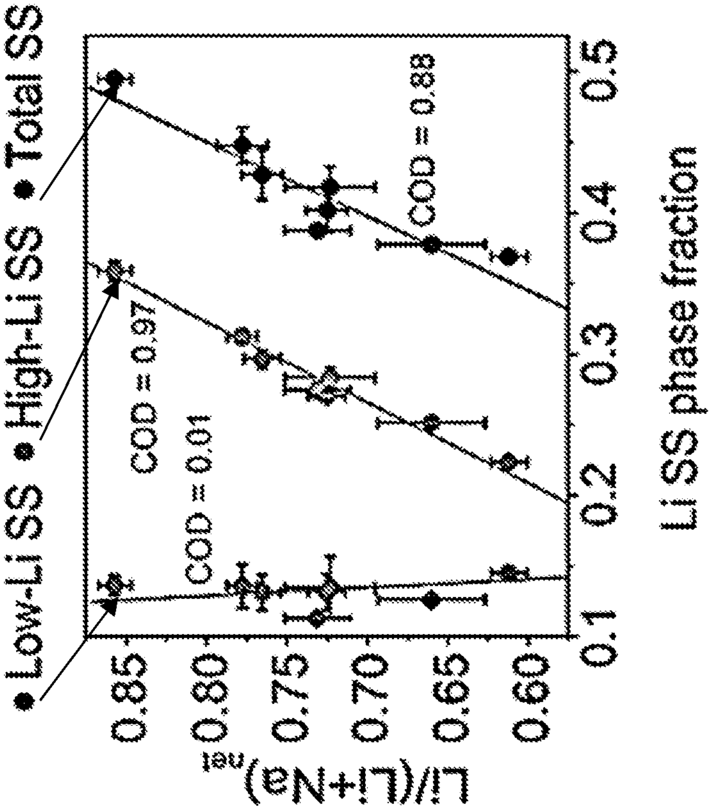
Figure 3F:
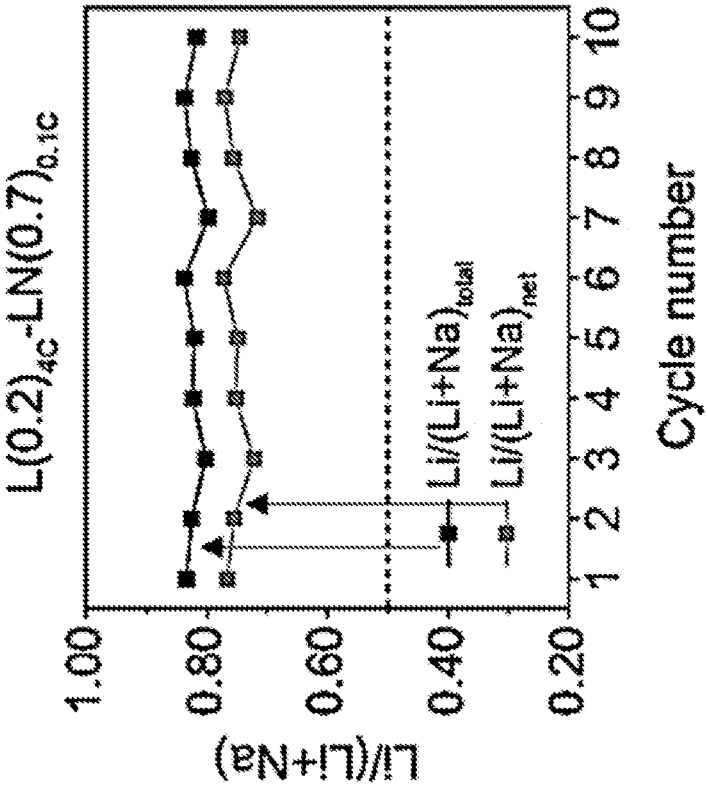
Figure 5:
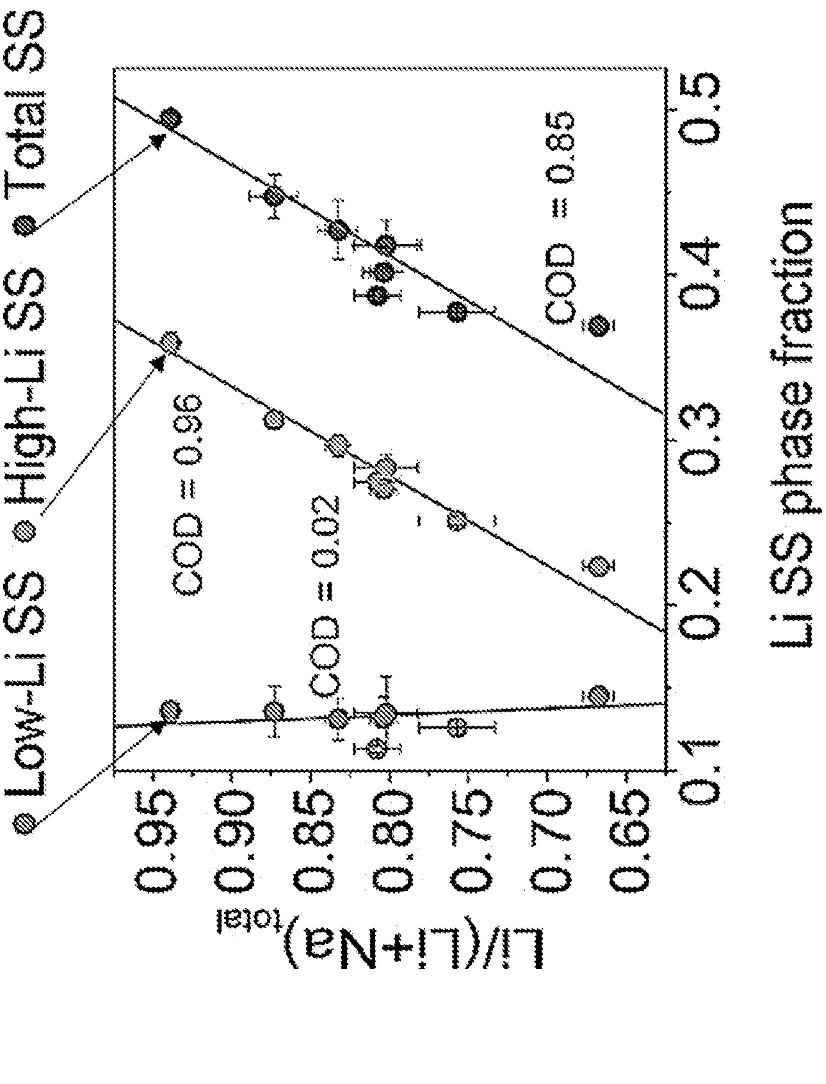
FIG. 5 shows Li/(Li+Na) total vs. low-Li/high-Li/total-Li SS fractions and corresponding COD.

To clearly illustrate the relationships between Li competitiveness and Li SS fractions, without the differentiation of seeding conditions, $Li/(Li+Na)_{net}$ (FIG. 3E) and $Li/(Li+Na)_{total}$ (FIG. 5) versus high-Li, low-Li, and total SS phase fractions were plotted for all the Li-seeded samples, with co-intercalation step run at 0.1 C. Coefficients of determination (COD) were calculated to quantify the correlations. The fraction of high-Li SS phases was strongly correlated to Li ratios (e.g., COD ($Li/(Li+Na)_{net}$ vs. high-Li SS)=0.97). In contrast, the fraction of low-Li SS phases was uncorrelated with the Li ratios (e.g., COD ($Li/(Li+Na)_{net}$ vs. low-Li SS)=0.01). Meanwhile, the $L(0.2)_{4C}$ seeding condition was tested for multiple cycles on one electrode, and the $Li/(Li+Na)_{net}$ was always maintained at ~0.73 (FIG. 3F), proving its stability.

High-Li Fraction SS Phases Promoting Li Competitiveness

Figure 4B:
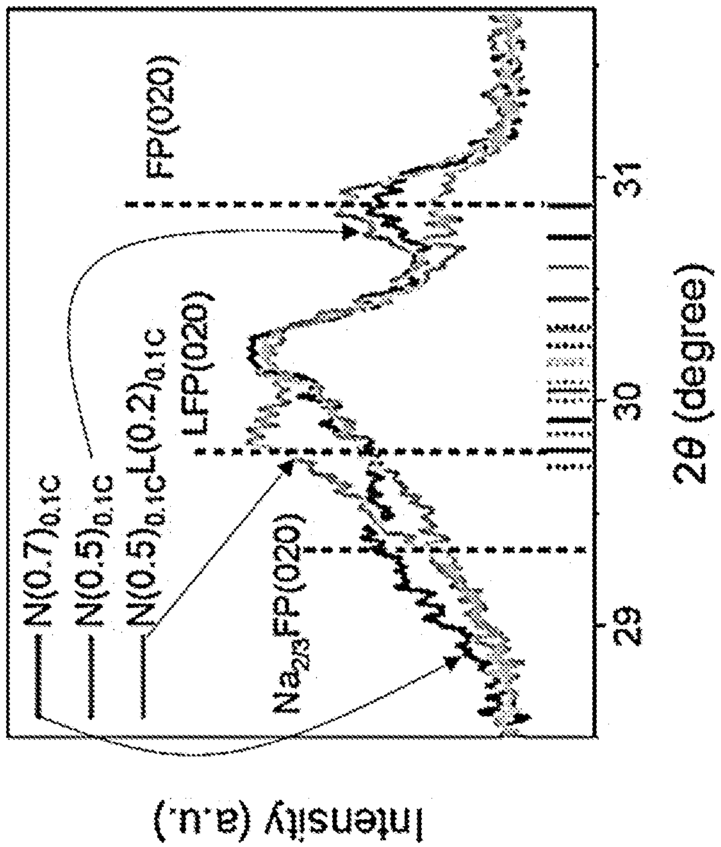
FIGS. 4A-4D show the effect of high-Li SS phases in promoting Li competitiveness.
Figure 4A:
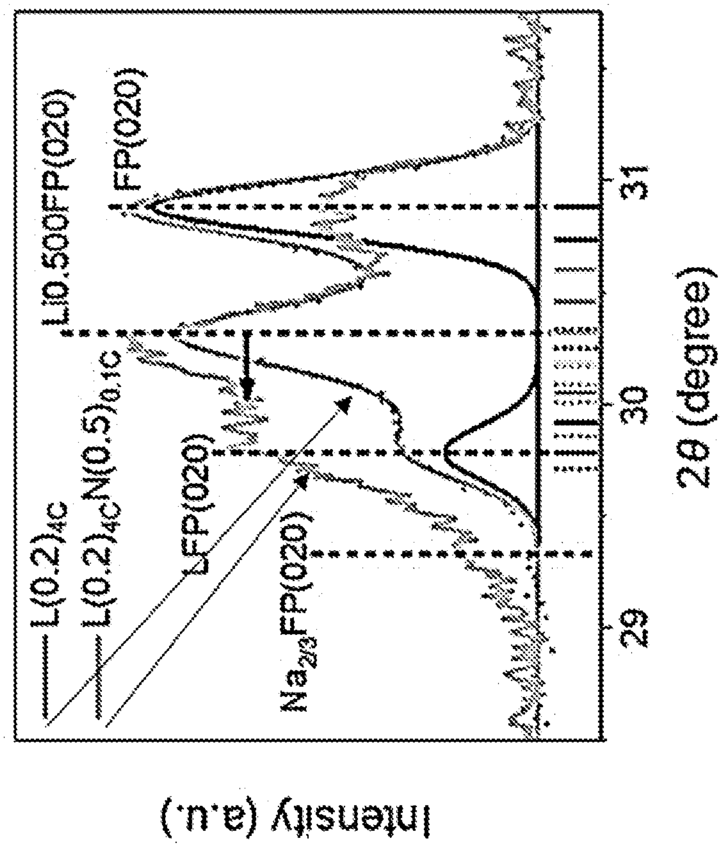

To further investigate the role of Li SS phases to Na intercalation, pure Na (1M NaCl) was directly intercalated in Li-seeded $L(0.2)_{4C}$ host to $L(0.2)_{4C}$-$N(0.5)_{0.1C}$ (XRD shown in FIG. 4A). Besides the expected increase of the $Na_{2/3}FePO_4$ phase and the decrease of empty $FePO_4$ phase, a pronounced increase of the relative peak intensity at the $LiFePO_4$ position and a shift of the SS band to high-Li positions (FIG. 4A) were seen. To confirm the phases were $LiFePO_4$ and high-Li SS phases, $N(0.5)_{0.1C}$, $N(0.7)_{0.1C}$ and $N(0.5)_{0.1C}$-$L(0.2)_{0.1C}$ were prepared (first intercalating 50% Na and then intercalating 20% Li) for comparison (FIG. 4B). Both $N(0.5)_{0.1C}$ and $N(0.7)_{0.1C}$ showed a broad band between $Na_{2/3}FePO_4$ (020) and $FePO_4$ (020), indicating an SS phase transition pathway for Na intercalation at 0.1 C. However, the SS bands of $N(0.5)_{0.1C}$ and $N(0.7)_{0.1C}$ did not overlap at the position of $LiFePO_4$. The onset of peak around the $LiFePO_4$ and high-Li SS positions only occurred with Li intercalation (also see $N(0.5)_{0.1C}$-$L(0.2)_{0.1C}$). This proves the formation of $LiFePO_4$ phase after pure Na intercalation into pre-seeded $L(0.2)_{4C}$. Using ICP-MS, it was further confirmed that the total amount of Li before and after Na intercalation did not change. Therefore, the formation of $LiFePO_4$ and the increase of high-Li SS phases are caused by the rearrangement of original Li responding to Na intercalation. Since the total Li amount does not change, the Li has to come from the low-Li SS phases. One possible pathway for the rearrangement is through Li moving out of the low-Li SS phases and adding to the high-Li SS phases. These results support that high-Li SS phases are more stable than low-Li SS phases upon Na intercalation. Meanwhile, without Na intercalation, simply soaking the electrode in the $NaCl_{(aq)}$ solution for the same amount of time as Na intercalation, the low-Li and high-Li SS phase fractions only showed a slight decrease (FIG. 4C), which could be attributed to the solvent assisted surface-ion diffusion at $FePO_4$. The extent of Li rearrangement is much less than that in the case of Na intercalation. Therefore, the significant Li rearrangement is mainly a response of Li phases upon Na competition. With the persistence of high-Li SS phases and diminishing of low-Li phases, it reveals that the pre-seeded Li SS phases are not equally effective in expelling Na during co-intercalation. The high-Li SS phases are more effective than the low-Li SS phases.

Figure 4D:
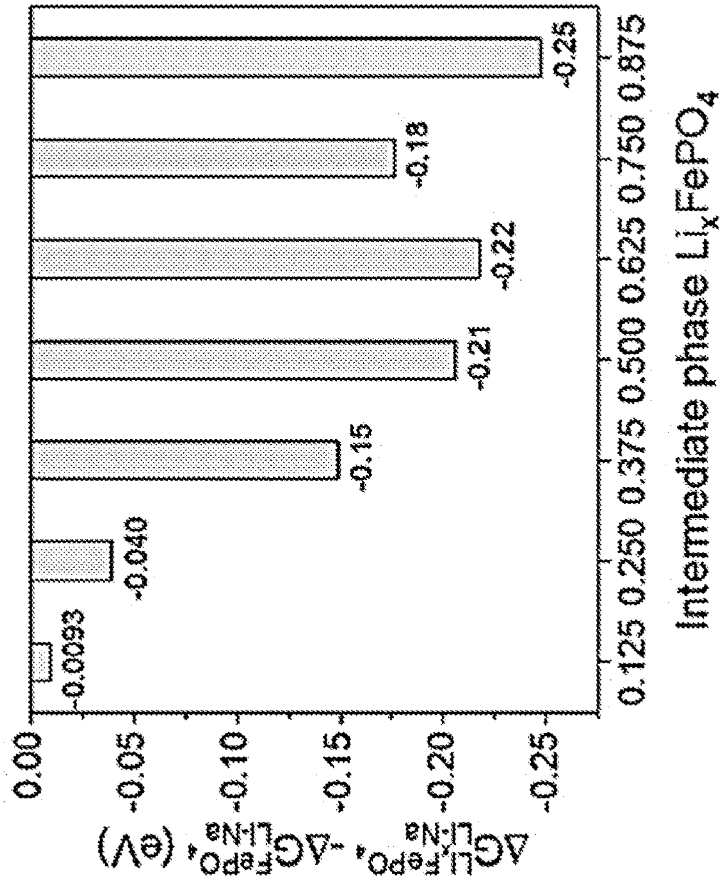
Figure 4C:
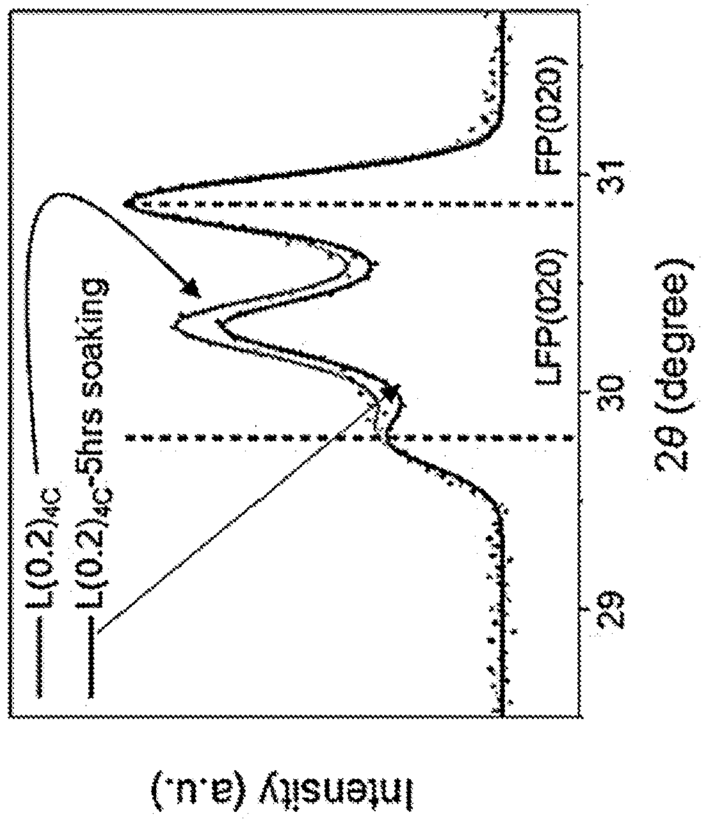
Figure 6:
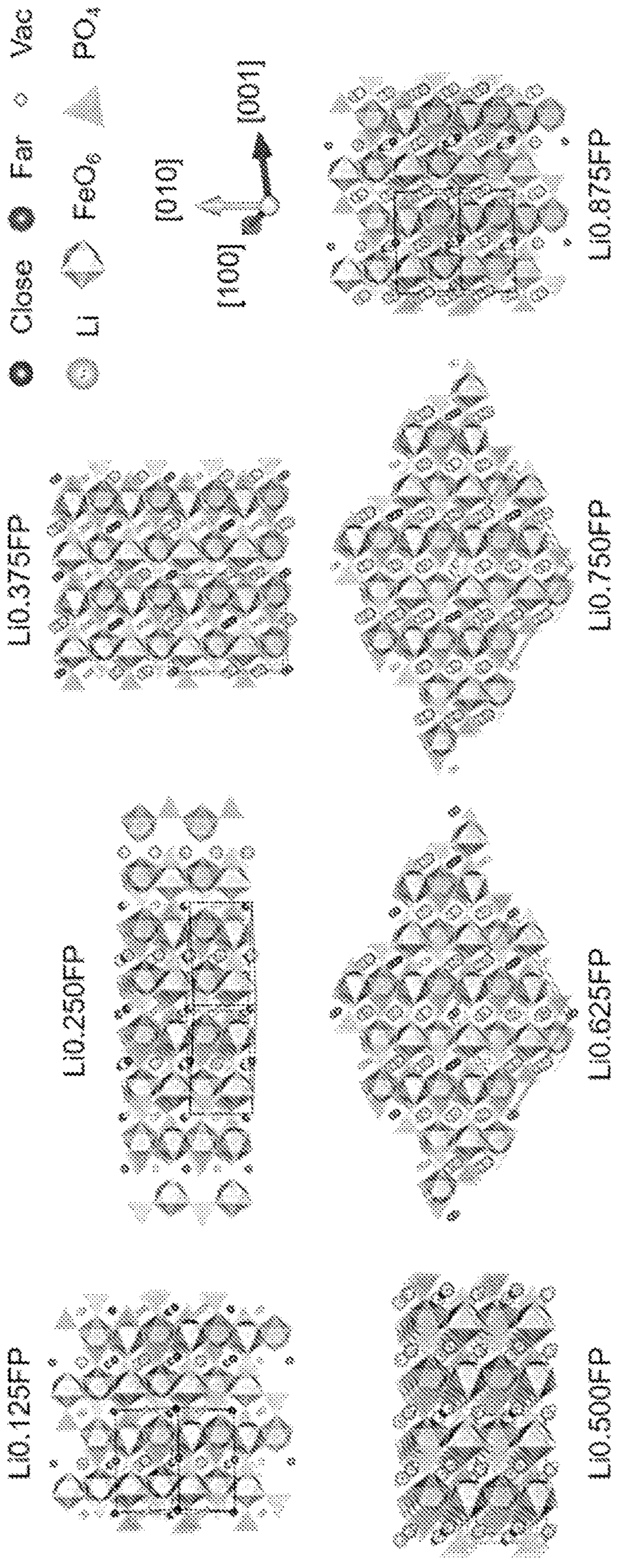
FIG. 6 shows structures for the seven intermediate phases with either close or far intercalation positions labeled.

Moreover, DFT was used to calculate the energy barrier differences between Li and Na intercalation in each intermediate SS phase to prove the effect of high-Li SS phases in promoting Li competitiveness. First, low energy supercell configurations were established for the seven intermediate phases, as shown in FIG. 6. The channel filling information was summarized in Table 2. From the calculation results, all seven Li SS phases, as well as the empty $FePO_4$ host, showed negative $\Delta G_{Li—Na}$ (Table 3), which means that thermodynamically Li intercalation is always preferred in all the structures of the 1D olivine host. The Li and Na intercalation energy difference clearly showed that all Li SS phases have enhanced Li preference, compared to the empty $FePO_4$ phase, as ($\Delta G_{Li—Na}^{LixFePO_4}$-$G_{Li—Na}^{FePO_4}$) are negative (FIG. 4D). Between low-Li SS phases and high-Li SS phases, high-Li SS phases have more negative ($\Delta G_{Li—Na}^{LixFePO_4}$-$G_{Li—Na}^{FePO_4}$) supporting the conclusion that high-Li SS phases are more effective in promoting Li intercalation competitiveness.

TABLE 2

Summarized channel filling information. Li atoms tend to occupy more channels, with equal fractions of vacancy and Li in each channel.

| Phase | Channel condition |
|---|---|
| Li0.125FP | ½ quarter + ½ empty |
| Li0.250FP | ¾ empty + ¼ full |
| Li0.375FP | ½ half (dimer) + ½ quarter |
| Li0.500FP | All half filled |
| Li0.625FP | ½ half (dimer) + ½ three quarters |
| Li0.750FP | All three-quarters filled |
| Li0.875FP | ½ full + ½ three-quarters |

TABLE 3

Summary of calculated potential difference for Li − Na intercalation of different phases.

| $Li_xFePO_4$ | Potential difference for Li − Na intercalation [eV] |
|---|---|
| 0.000 | −1.1676 |
| 0.125 | −1.1769 |
| 0.250 | −1.2072 |
| 0.375 | −1.3164 |
| 0.500 | −1.3732 |
| 0.625 | −1.3849 |
| 0.750 | −1.3435 |
| 0.875 | −1.4148 |

Methods

Synthesis of $FePO_4$ microplatelets. To synthesize pristine $LiFePO_4$ microplatelets, a solvothermal method with a mixed water and polyethylene glycol solvent was used, modified slightly from the previous report. (Li, Y. et al., 2018.) All the operations were done in an $N_2/H_2O$ glovebox to ensure that all precursors were not exposed to oxygen. 6 mL of 0.2 M $H_3PO_{4(aq)}$ was mixed with 24 ml of polyethylene glycol 400. Afterward, 18 mL of 0.2 M $LiOH_{(aq)}$ was added to create the creamy-white $Li_3PO_4$ precipitate. This mixture was stirred in an $N_2$ glovebox overnight to remove dissolved oxygen. 1.2 mmol of $FeSO_4·7H_2O$ was dried under vacuum in a Schlenk line overnight, while 12 mL of $H_2O$ was stored in the $N_2$ glove box for deoxygenation. Next, the deoxygenated $H_2O$ was transferred to the dried $FeSO_4$ powder and stirred for about 10 minutes, creating a lime-green solution. The $FeSO_4$ solution was transferred to the $Li_3PO_4$ suspension without oxygen exposure, and the entire mixture was transferred to a 100 mL Teflon-lined autoclave. The autoclave was heated to 140° C. for 1 h, then to 210° C. for 17 h and cooled. This procedure yielded micro-sized $LiFePO_4$ platelet particles. After the synthesis was completed, the white $LiFePO_4$ particles were centrifuged three times with deionized water and dried. Carbon-coating was conducted by mixing the $LiFePO_4$ with sucrose at a mass ratio of 5:1 ($LiFePO_4$:sucrose) without breaking the primary particles. This sample was heated to 600° C. for 5 h in a tube furnace under flowing Ar to yield the carbon-coated $LiFePO_4$. For chemical extraction of Li from carbon-coated $LiFePO_4$, an oxidizing solution was prepared by dissolving 1.36 g of nitronium tetrafluoroborate ($NO_2BF_4$) in 80 mL of acetonitrile. 0.8 g of carbon-coated $LiFePO_4$ powder was immersed into the solution and stirred for 24 h at room temperature. The powder was then washed several times by acetonitrile and finally dried in a vacuum oven for 12 h. Powder X-ray diffraction with Rietveld refinement confirms that both $LiFePO_4$ and $FePO_4$ are single-phase.

Preparation of electrodes. The $FePO_4$ electrodes were prepared by casting a slurry of $FePO_4$, Super P carbon black, and polyvinylidene fluoride with a mass ratio of 80:10:10, in N-methyl-2-pyrrolidone. The electrode slurry was drop cast on a 0.5×1 $cm^2$ geometrical surface of a carbon cloth (ELAT-H, FuelCellEtc) current collector of 5×1 $cm^2$ and dried on a hotplate at 100° C. overnight. $TiO_2$ was coated onto the $FePO_4$ electrodes using ALD (Savannah G2 Thermal ALD) at 100° C., 0.645 Å/cycle with tetrakis(dimethylamido)titanium (IV) and $H_2O$ as precursors. During tests, the other end of the carbon cloth was connected to a Pt clamp. The active material mass loadings ranged between 7 and 14 mg $cm^{-2}$. $NaFePO_4$ counter electrodes were made with the same slurry depositing on carbon felt (Alfa Aesar) disks (0.9525 cm diameter x 3.18 mm thickness) by galvanostatically sodiating $FePO_4$ in 1M $NaCl_{(aq)}$ at a C/20 rate until reaching a −0.6 V versus Ag/AgCl voltage cutoff. C N describes the current to (de)intercalate the electrode in Nh. The active material mass loading on the counter electrodes ranged between 60 and 70 mg $cm^{-2}$.

Electrochemical methods. All electrochemical operations were performed on a Bio-Logic VMP3 workstation using a three-neck round-bottomed flask in the $N_2$ atmosphere with Ag|AgCl|KCl (4.0 M) as the reference electrode. During seeding process, $FePO_4$ cathode electrodes were paired with $LiFePO_4$ counter electrodes for galvanostatically intercalation in 60 mL 1 M pure $LiCl_{(aq)}$ with different C rates (0.1 C, 2C, 4 C, 6 C and 8 C) and capacity range (10%, 20%, 30% and 40%). For example, $L(0.2)_{4C}$ means seeding 20% of Li into $FePO_4$ hosts under 4C. After the seeding process, electrodes were rinsed with 1 L of DI water with a flow rate of ~0.3 L/min to remove adsorbed $Li^+$ and ready for the intercalation process. Specifically, L(0) means no seeding process. During intercalation process, with or without seeding, all the working electrodes, paired with $NaFePO_4$ counter electrodes, would undergo intercalation in 500 mL of synthetic brine solutions (1 mM LiCl and 1 M NaCl mixed solution) until 70% of the total capacity using different intercalation C rates (0.1 C, 0.2 C, 0.5 C, 1 C, and 4 C). For example, $L(0.2)_{4C}$-$LN(0.7)_{0.1C}$ means, after 4 C-20% seeding process, the intercalation was carried out under 0.1 C until 70% of capacity was used.

Indicators for Li extraction performance. After finishing the Li extraction in Na-dominated solutions, the electrode was first rinsed in three different 60 mL DI water for 30 min with continuous $N_2$ bubbling to remove excess adsorbed cations. The electrode was then de-intercalated in 30 mM $NH_4HCO_3$ solution with constant current C/30 rate to a cutoff voltage of 0.6 V versus Ag/AgCl with a graphite rod (Sigma-Aldrich, 99.995%) as the counter electrode. The solution before and after the deintercalation process was collected for ICP-MS for Li and Na concentration measurement. Two different Li/(Li+Na) ratios are reported here. One is $Li/(Li+Na)_{total}$, which denotes the ratio of total Li+ in the recovery solution, and another one is $Li/(Li+Na)_{net}$, which subtracts the contributions from the seeded-Li. For example, the tested $Li/(Li+Na)_{total}$ from ICP-MS results for $L(0.2)_{4C}$-$LN(0.7)_{0.1C}$ is 0.802. Therefore, the calculated $Li/(Li+Na)_{net}$ should be:

$$Li/(Li+Na)_{net} = \frac{Li/(Li+Na)_{total} \cdot \text{Total used capacity} - \text{Seeded Li Capacity}}{\text{Co} - \text{intercalated capacity}} = \frac{0.802 \times 0.7 - 0.2}{(0.7 - 0.2)} = 0.723$$

Another indicator is the Li selectivity, which is defined by the following equation:

$$Li_{selectivity} = \frac{([Li]/[Na])_{final}}{([Li]/[Na])_{initial}}$$

XRD characterization. To prepare the seeded electrodes with SS maintained in the structure, the electrodes were quickly disassembled from the beaker cells, rinsed with excess DI water to remove the adsorbed ions, dried under vacuum for 20 min, and then sent for XRD measurements. The disassembly process was completed within 2 min of stopping the current. By rapidly disassembling the electrode and removing the electrolyte, inter-particle Li transport was minimized. XRD was carried out on a Rigaku MiniFlex 600 diffractometer, using Cu Kα radiation (Kα1:1.54059 Å; Kα2:1.54441 Å; Kα12 ratio: 0.4970). The tube voltage and the current used were 40 kV and 15 mA. Diffractograms were recorded with a 0.01° step width and a 5°/min speed. Rietveld refinement was executed on synthesized pristine $LiFePO_4$ and $FePO_4$ microplatelets using GSAS-II software.

ICP-MS characterization. 3% $HNO_{3(aq)}$ was used as the diluting matrix and all the measurements used either Thermo iCAP Q ICP-MS or Thermo iCAP RQ ICP-MS.

SEM characterization. Scanning electron microscopy (SEM, Zeiss Merlin) was performed at the accelerating voltage of 10 kV.

STEM-EDS characterization. STEM images were acquired using JEOL ARM 200F equipped with a cold field emission source operated at 200 kV. STEM EDS mapping was acquired using an Oxford X-Max 100TLE windowless SDD detector equipped with JEOL ARM 200F.

SEND characterization. Scanning electron nanodiffraction patterns were acquired using a Themis Z S/TEM (Thermo Scientific, Waltham, USA). The microscope was operated in the μProbe STEM mode with an acceleration voltage of 300 kV. The electron probe focused on the sample had a semi-convergence angle of 0.46 mrad, and a probe size of 1.8 nm in FWHM. For strain mapping, camera length was set at 360 mm so that in each diffraction pattern, the positions of about 40 diffraction peaks could be measured using the circular Hough transform method to fit a 2D reciprocal lattice. Diffraction patterns were recorded using a CMOS camera (Ceta, Thermo Scientific) at the resolution of 1024×1024 pixels and 0.1 s exposure time per diffraction pattern. The scan was over an area of 600×400 $nm^2$ with a step size of 10 nm. The lattice parameters and measurement error are converted from diffraction peaks and uncertainty of peak detection, respectively, following previous works. (Yuan, R., et al., Ultramicroscopy 207, 112837, (2019); Yuan, R., et al., Microscopy and Microanalysis 23, 180-181, (2017).)

Additional Details

Calculations for $FePO_4$—$LiFePO_4$—$NaFePO_4$ Ternary Phase Diagram

Total Energy Calculation

Total energies of structures were determined using DFT calculations with the project augmented-wave (PAW) approach as implemented in the Vienna ab initio Simulation package (VASP). (P. E. Blöchl, et al., Phys. Rev. B 1994, 49, 16223; G. Kresse, et al., Computational Materials Science 1996, 6, 15; G. Kresse, et al., Phys. Rev. B 1996, 54, 11169.) A plane wave energy cutoff of 520 eV and a Gamma-centered k-point grid with a k-point density of at least 1000/(number of atoms in unit cell) was used. The Perdew-Burke-Ernzerhof (PBE) generalized-gradient approximation (GGA) exchange-correlation functional with the GGA+U extension. (J. P. Perdew, et al., Physical Review Letters 1996, 77, 3865; J. P. Perdew, et al., The Journal of Chemical Physics 1996, 105, 9982.) A U value of 5.3 eV was used for Fe which was determined by the Materials Project by fitting experimental binary formation enthalpies of TM oxides. (L. Wang, et al., Phys. Rev. B 2006, 73, 195107; A. Jain, et al., APL Materials 2013, 1, 011002; V. I. Anisimov, et al., Journal of Physics: Condensed Matter 1997, 9, 767.) All structures were fully optimized until the energy was converged to within $10^{-5}$ eV per supercell and the forces on each atom were less than 0.02 eV/Angstroms.

Structure Search

DFT energies of the $Li_xNa_yFePO_4$ ($0 \le x+y \le 1$) system were fit using a cluster expansion (CE) model to search for low-energy configurations given a maximum supercell size. The CE formalism is a well-established approach for studying ordering in alloys. (W. Chen, et al., Phys. Rev. B 2011, 83, 075415; J. M. Sanchez, et al., Physica A: Statistical Mechanics and its Applications 1984, 128, 334; W. Chen, et al., The Journal of Physical Chemistry C 2011, 115, 17915; W. Chen, et al., Langmuir 2012, 28, 4683.) In the CE model the mixing enthalpies of the structures are parametrized using clusters, a. The mixing enthalpy of each structure's configuration σ is fit using a sum of weighted cluster correlation functions based on the products of occupation variables $\sigma_i$. $J_\alpha$ is the effective cluster interaction (ECI) for the cluster α. Using a chosen set of clusters, the energy of a structure with a configuration u given by occupation variables $\sigma_i$ is predicted using Eq. 1.

$$\Delta E(\sigma) = \sum_{\alpha} m_\alpha J_\alpha \prod_{i \in \alpha'} \sigma_i \quad (1)$$

where $m_\alpha$ is the multiplicity of cluster α, which is determined by the symmetry of the parent lattice. In this study two cluster expansions were fit, one for the ternary system and a second one focusing on the Li— vacancy edge of the $Li_xNa_yFePO_4$ system. In total, 506 DFT energies were calculated, with 161 of those on the Li-vacancy edge. The 506 structures show that the only intermediate structure stable with respect to the terminal compositions $LiFePO_4$, $NaFePO_4$ and $FePO_4$ is $Na_{0.66}FePO_4$. From the set of 161 structures on the Li-vacancy edge, low energy configurations with greater separation of structural Li atoms and vacancies were selected for seven intermediate Li concentrations. The selected structures were later used to calculate the difference between Li and Na intercalation potentials. The search for low energy configurations considered all supercells containing at most 86 atoms. In this work, the ICET package was used for the construction of the CE model. (M. Ångqvist, et al., Advanced Theory and Simulations 2019, 2, 1900015.) A large cluster space (2280) with clusters up to the fourth order (quadruplets) were considered, and the Automatic relevance determination regression (ARDR) algorithm with regularization parameter, λ=15000, was used to optimize a sparse set of clusters for the CE model.

Deconvolution of Solid-Solution Fraction from Diffraction Patterns

To quantify the solid-solution fraction in Li-seeded $FePO_4$, the obtained X-ray diffraction patterns were fit to a number of Gaussians, following previous work. (Y. Li, et al., Nat. Mater. 2018, 17, 915; M. Hess, et al., Nature Communications 2015, 6, 8169.) The standard LeBail refinement was only possible for the end phases of $LiFePO_4$ and $FePO_4$ because the lattice parameters of all intermediate phases are completely interchangeable. (A. Le Bail, Powder Diffraction 2005, 20, 316.) Fortunately, Vegard's law has been experimentally demonstrated to be valid in the case of $Li_xFePO$. (Hess, et al., 2015; C. Delacourt, et al., Nat. Mater. 2005, 4, 254; P. Gibot, et al., Nat. Mater. 2008, 7, 741; N. Sharma, et al., Journal of the American Chemical Society 2012, 134, 7867.) Generally, the corresponding lattice parameters can be first calculated for all intermediate phases with a linear combination of the refined end phases for $LiFePO_4$ and $FePO_4$, and then the peak positions for all intermediate phases can be gotten. Detailed steps are described below:

LeBail refinement of the end phases of $LiFePO_4$ and $FePO_4$: The fitted lattice parameters for $LiFePO_4$ and $FePO_4$ are summarized in Table 4.

Applying the Vegard's law to calculate the lattice parameters for intermediate phases (Table 4): The deconvolution of a pattern using an infinite number of phases was assumed to be impossible. Thus, the patterns were deconvoluted for the seven intermediate phases of composition $Li_xFePO_4$, x=[0.125:0.125:0.875] with the space group parameter being a linear combination of the refined end phases for $LiFePO_4$ and $FePO_4$ (lattice parameters a, b, and c for space group Pnma for $LiFePO_4$ were 10.347, 6.007 and 4.700 Å, and those for FP were 9.819, 5.798 and 4.785 Å).

Calculating the peak positions according to the lattice parameters in b with GSAS II software: (211) and (020) peaks were used as characteristic peaks for the fitting, and the positions are summarized in Table 5.

Calculating (211) and (020) area ratios: The LeBail refinement of the $FePO_4$ pattern showed that the ratio between the (211) and the (020) reflection areas is 0.38. Since the (211) peak and (020) peak in $LiFePO_4$ are too close to distinguish, we use 0.23 as the area ratio according to M. Hess, et al., 2015. Area ratios of all intermediate phases also follow the linear combination of these two end-up phases, which are summarized in Table 6.

TABLE 4

Lattice parameters for all the phases.

| | LFP | L0.875FP | L0.750FP | L0.625FP | L0.500FP | L0.375FP | L0.250FP | L0.125FP | FP |
|---|---|---|---|---|---|---|---|---|---|
| a | 10.347 | 10.281 | 10.215 | 10.149 | 10.083 | 10.017 | 9.951 | 9.885 | 9.819 |
| b | 6.007 | 5.981 | 5.955 | 5.929 | 5.903 | 5.877 | 5.850 | 5.824 | 5.798 |
| c | 4.700 | 4.711 | 4.721 | 4.732 | 4.743 | 4.753 | 4.764 | 4.775 | 4.785 |
| α | | | | | 90 | | | | |
| β | | | | | | | | | |
| γ | | | | | | | | | |

TABLE 5

(211) and (020) peak positions for all the phases.

| Peak | LFP | L0.875FP | L0.750FP | L0.625FP | L0.500FP | L0.375FP | L0.250FP | L0.125FP | FP |
|---|---|---|---|---|---|---|---|---|---|
| (211) | 29.69 | 29.76 | 29.83 | 29.91 | 29.98 | 30.06 | 30.14 | 30.23 | 30.31 |
| (020) | 29.76 | 29.89 | 30.02 | 30.16 | 30.30 | 30.43 | 30.57 | 30.71 | 30.86 |

TABLE 6

| (211) and (020) area ratios for all the phases. | | | | | | | | | |
|---|---|---|---|---|---|---|---|---|---|
| Area ratio | LFP | L0.875FP | L0.75FP | L0.625FP | L0.5FP | L0.375FP | L0.25FP | L0.125FP | FP |
| (211) (020) | 0.23 | 0.249 | 0.268 | 0.286 | 0.305 | 0.324 | 0.343 | 0.361 | 0.38 |

Normalization of areas: The scattering factors of $LiFePO_4$ and $FePO_4$ differ. Therefore, all areas were normalized to the area of $LiFePO_4$ by dividing the area of $FePO_4$ by a factor of 1.2415.

Fitting the XRD spectra with nine species: two end phases, $FePO_4$ and $LiFePO_4$, and seven intermediate phases. The difference of SOC between two adjacent phases is set as 12.5%. And each phase will contribute two peaks, one is (020) peak and another one is (211) peak. So in total, the band needs to be fit with 18 Gaussians. All the areas of peak (211) and (020) can be gotten for each $Li_xFePO_4$ phase (x=0/0.125/0.250/0.375/0.500/0.625/0.750/0.875/1).

The phase fraction of each $Li_xFePO_4$ phase ($P.F._{LixFP}$) is defined to be:

$$P.F._{Li_xFP} = \frac{[A_{Li_xFP}(211) + A_{Li_xFP}(020)] \cdot x + \frac{[A_{Li_xFP}(211) + A_{Li_xFP}(020)] \cdot (1-x)}{1.24}}{\sum\left\{[A_{Li_xFP}(211) + A_{Li_xFP}(020)] \cdot x + \frac{[A_{Li_xFP}(211) + A_{Li_xFP}(020)] \cdot (1-x)}{1.24}\right\}}$$

where $A_{Li_xFP}(211)$ is the area of $Li_xFePO_4$ (211) peak and $A_{Li_xFP}(020)$ is the area of the $Li_xFePO_4$ (020) peak.

Calculating Li—Na Potential Difference with Respect to Solvated Ions

For the structures on the Li-vacancy edge of the $Li_xNa_y$-$FePO_4$ system, the difference in potential for intercalating Li vs Na was calculated by determining the energy contribution from the cathode half-cell reaction shown in the equation below:

$$A_{n-x}FePO_4(s) + xA^+(solv) + xe^- \xrightarrow{\Delta G^{cathode}} A_nFePO_4(s).$$

The preference of Li vs. Na is compared by calculating the concentration corrected chemical potential of Li and Na. To be specific, $$\Delta G^{cathode}_{solvated,A^+} = -x\Delta G^{A^+}_{solv} - xIE - \Delta G^{cathode}_{atom,A} + 0.059\log\left(\frac{1}{[A]^x}\right),$$

where $\Delta G^{cathode}$ is the energy to extract an isolated atom A from the cathode, IE is the ionization energy of A, and $\Delta G^{A+}$ is the solvation energy of $A^+$. Precisely, according to the literature, the ionization energy for Li and Na are 5.39171 eV and 5.13908 eV respectively. (CRC Handbook of Chemistry and Physics, Internet Version 2011, ed. D. R. Lide, 91st ed.; CRC Press, 2010; pp 10-203-10-205.) Meanwhile, the solvation energy for $Li^+$ and $Na^+$ are 5.389 eV and 4.198 eV respectively. (Y. Marcus, Ion Solvation; John Wiley & Sons, 1985; p 306.) The Li and Na potentials were calculated at 8 different Li concentrations (0, 0.125, 0.25, 0.375, 0.5, 0.625, 0.75, and 0.875). At each composition, among the low energy configurations the configurations with greater separation of structural Li atoms and vacancies were selected. This is because the thermodynamically stable state of these compositions is a decomposition into $LiFePO_4$ and $FePO_4$. For each selected configuration a single Li or Na atom was placed on a vacancy site. If there were vacancy sites with different numbers of first, second, third structural Li nearest neighbors, two different calculations were performed: one where the added Li or Na atom was placed in order to maximize the proximity of structural Li atoms, and another where the Li or Na atom was placed as far away from the structural Li atoms as possible. Of the two resulting energies, the one with the lower energy was used for the Li and Na potential calculation. All configurations corresponded to 56 atom supercells if all vacancies were filled; therefore, with the addition of a single Li or Na atom x in the above equations is 0.125.

Then the Li—Na potential difference for each phase can be calculated using the following equation:

$$\Delta G^{Li_xFePO_4}_{Li-Na} = \Delta G^{Li_xFePO_4}_{solvated,Li^+} - \Delta G^{Li_xFePO_4}_{solvated,Na^+}.$$

The calculated Li—Na intercalation potential differences for each phase are summarized in Table 3. Channel filling information is also provided for each intermediate phase in Table 2 for reference. More negative Li—Na potential difference shows that the intercalation of Li is more preferred to the intercalation of Na.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for extracting lithium ions from a sample, the method comprising:

seeding [010] diffusion channels in an intercalation compound having an olivine crystal structure with lithium ions to form high lithium-content phases in the intercalation compound;

exposing the lithium-seeded intercalation compound to a sample comprising lithium ions and sodium ions, and lithiating the lithium-seeded intercalation compound via selective intercalation of lithium ions into the lithium-seeded intercalation compound;

removing the lithiated intercalation compound from the sample; and extracting lithium ions from the lithiated intercalation compound to form an intercalation compound that is at least partially delithiated.

2. The method of claim 1, wherein the seeding of the intercalation compound is conducted electrochemically.

3. The method of claim 2, wherein the selective intercalation of the lithium ions is conducted electrochemically.

4. The method of claim 1, wherein the selective intercalation of the lithium ions is conducted electrochemically.

5. The method of claim 1, wherein the intercalation compound is seeded to a lithium concentration of at least 10% of total capacity.

6. The method of claim 1, wherein the intercalation compound is seeded to a lithium concentration in a range from 20% to 50% of total capacity.

7. The method of claim 1, wherein the fraction of high lithium-content phases in the seeded intercalation compound is at least 0.25.

8. The method of claim 1, wherein the sample comprises brine, geothermal fluid, or industrial wastewater.

9. The method of claim 1, wherein the lithium concentration in the intercalation compound after extracting lithium ions is at least 10% of the total capacity.

10. The method of claim 9, further comprising:

exposing the partially delithiated intercalation compound to a sample comprising lithium ions and sodium ions, whereby the partially delithiated intercalation compound is relithiated via the selective intercalation of lithium ions into the partially delithiated intercalation compound;

removing the relithiated intercalation compound from the sample; and extracting lithium ions from the relithiated intercalation compound.

11. The method of claim 1, wherein the intercalation compound is a transition metal phosphate having the formula $TMPO_4$, where TM represents Mn, Fe, Co, Ni, V, or a combination of two or more thereof and the high lithium-content phases have the formula $Li_xTMPO_4$, where $0.5 \leq x < 1$.

12. The method of claim 11, wherein TM comprises iron.

13. The method of claim 12, wherein the fraction of high lithium-content phases in the seeded intercalation compound is at least 0.25 and the lithium concentration in the intercalation compound after extracting lithium ions is at least 10% of the total capacity.

14. The method of claim 11, wherein TM is iron.

15. The method of claim 14, wherein the fraction of high lithium-content phases in the seeded intercalation compound is in the range from 0.25 to 0.35.

16. The method of claim 1, wherein the intercalation compound is a transition metal silicate having the formula $TMSiO_4$, where TM represents Mn, Fe, Co, Ni, V, or a combination of two or more thereof and the high lithium-content phases have the formula $Li_xTMSiO_4$, where $0.5 \leq x < 1$.

17. The method of claim 16, wherein TM comprises iron.

18. The method of claim 17, wherein the fraction of high lithium-content phases in the seeded intercalation compound is at least 0.25 and the lithium concentration in the intercalation compound after extracting lithium ions is at least 10% of the total capacity.

19. The method of claim 16, wherein TM is iron.

* * * * *